(12) United States Patent
Mills et al.

(10) Patent No.: US 8,378,280 B2
(45) Date of Patent: Feb. 19, 2013

(54) INTEGRATED SOLAR ENERGY RECEIVER-STORAGE UNIT

(75) Inventors: David R. Mills, Palo Alto, CA (US); Peter K. Le Lievre, Palo Alto, CA (US)

(73) Assignee: Areva Solar, Inc., Mountain View, CA (US)

( * ) Notice: Subject to any disclaimer, the term of this patent is extended or adjusted under 35 U.S.C. 154(b) by 887 days.

(21) Appl. No.: 12/157,064

(22) Filed: Jun. 6, 2008

(65) Prior Publication Data

US 2009/0322089 A1    Dec. 31, 2009

Related U.S. Application Data

(60) Provisional application No. 60/933,620, filed on Jun. 6, 2007, provisional application No. 60/933,619, filed on Jun. 6, 2007.

(51) Int. Cl.
*F24J 2/34* (2006.01)

(52) U.S. Cl. .............. 250/203.4; 60/641.8; 60/641.11; 60/641.15; 126/619

(58) Field of Classification Search ........... 250/203.4; 126/569, 617, 619, 683–697; 136/206; 60/203.1, 60/641.8, 641.11, 641.12, 641.15
See application file for complete search history.

(56) References Cited

U.S. PATENT DOCUMENTS

| | | |
|---|---|---|
| 787,145 A | 4/1905 | Brown |
| 1,174,602 A | 3/1916 | Naylor |
| 1,240,890 A | 9/1917 | Shuman at al. |
| 2,291,534 A * | 7/1942 | Deppe ................ 264/345 |
| 2,793,018 A | 5/1957 | Trombe |
| 2,846,724 A | 8/1958 | Aylwin |
| 3,026,858 A | 3/1962 | Fleischer |
| 3,064,418 A * | 11/1962 | Sanders ................ 60/203.1 |
| 3,311,458 A | 3/1967 | Schunemann |
| 3,464,885 A | 9/1969 | Land et al. |
| 3,466,119 A | 9/1969 | Francia |
| 3,861,379 A | 1/1975 | Anderson, Jr. |
| 3,884,217 A | 5/1975 | Wartes |
| 3,892,433 A | 7/1975 | Blake |
| 3,920,413 A | 11/1975 | Lowery |
| 3,956,030 A | 5/1976 | Lee et al. |
| 3,986,021 A | 10/1976 | Hitchcock |
| 3,995,429 A | 12/1976 | Peters |

(Continued)

FOREIGN PATENT DOCUMENTS

| | | |
|---|---|---|
| BE | 1013565 A3 | 4/2002 |
| DE | 28 02 859 A1 | 7/1979 |

(Continued)

OTHER PUBLICATIONS

Abengoa Solar. (Date Unknown, Web Document Created Feb. 25, 2008). "Solutions to Global Climate Change," located at <http://www.abengoasolar.com/corp/export/sites/solar/resources/pdf/Sevilla_PV.pdf, last visited on Aug. 17, 2010, fourteen pages.

(Continued)

*Primary Examiner* — John Lee

(74) *Attorney, Agent, or Firm* — Morrison & Foerster LLP

(57) ABSTRACT

Receivers for use in solar energy collector systems and solar-powered electrical energy generating plants are provided. The receivers comprise a solar radiation absorbing core that converts absorbed solar radiation to thermal energy. The core comprises a refractory material to allow the receivers to operate continuously at high temperatures reached by absorbing concentrated solar radiation. The thermal energy so generated in the core may be stored in the receiver for a transitory period, or for a more extended period. Receivers may comprise one or more fluid channels in and/or around the core for conveying a working fluid to facilitate extraction of stored thermal energy from the core.

28 Claims, 6 Drawing Sheets

U.S. PATENT DOCUMENTS

| | | | |
|---|---|---|---|
| 4,000,851 A | 1/1977 | Heilemann | |
| 4,022,184 A | 5/1977 | Anderson | |
| 4,033,118 A | 7/1977 | Powell | |
| 4,054,246 A | 10/1977 | Johnson | |
| 4,056,313 A | 11/1977 | Arbogast | |
| 4,069,674 A | 1/1978 | Warren | |
| 4,081,966 A | 4/1978 | deGeus | |
| 4,088,120 A | 5/1978 | Anderson | |
| 4,091,622 A | 5/1978 | Marchesi | |
| 4,106,485 A | 8/1978 | Polley | |
| 4,108,154 A | 8/1978 | Nelson | |
| 4,111,184 A | 9/1978 | Perkins | |
| 4,117,682 A | 10/1978 | Smith | |
| 4,122,833 A | 10/1978 | Lovelace et al. | |
| 4,124,061 A | 11/1978 | Mitchell et al. | |
| 4,136,671 A | 1/1979 | Whiteford | |
| 4,138,995 A | 2/1979 | Yuan | |
| 4,141,626 A | 2/1979 | Treytl et al. | |
| 4,144,716 A | 3/1979 | Chromie | |
| 4,148,300 A * | 4/1979 | Kaufman, Sr. | 126/684 |
| 4,149,523 A | 4/1979 | Boy-Marcotte et al. | |
| 4,157,290 A | 6/1979 | Ladislav et al. | |
| 4,159,710 A | 7/1979 | Prast | |
| 4,177,325 A | 12/1979 | Roberts et al. | |
| 4,184,477 A | 1/1980 | Yuan | |
| 4,203,426 A | 5/1980 | Matlock et al. | |
| 4,210,201 A | 7/1980 | O'Hanlon | |
| 4,210,463 A | 7/1980 | Escher | |
| 4,210,643 A | 7/1980 | Fleisch et al. | |
| 4,215,553 A | 8/1980 | Poirier et al. | |
| 4,220,140 A | 9/1980 | Francia | |
| 4,229,076 A | 10/1980 | Chromie | |
| 4,238,265 A | 12/1980 | Deminet | |
| 4,239,344 A | 12/1980 | Wildenrotter | |
| 4,243,018 A | 1/1981 | Hubbard | |
| 4,263,895 A | 4/1981 | Colao | |
| 4,265,224 A * | 5/1981 | Meyer | 126/572 |
| 4,267,881 A | 5/1981 | Byerly | |
| 4,268,332 A | 5/1981 | Winders | |
| 4,276,440 A * | 6/1981 | Cannelli | 136/206 |
| 4,281,640 A | 8/1981 | Wells | |
| 4,289,115 A | 9/1981 | O'Hanlon | |
| 4,291,677 A | 9/1981 | Monk | |
| 4,304,221 A | 12/1981 | Trihey | |
| 4,312,324 A | 1/1982 | Ross et al. | |
| 4,318,393 A * | 3/1982 | Goldstein | 126/647 |
| 4,333,447 A | 6/1982 | Lemrow et al. | |
| 4,337,827 A | 7/1982 | Jabsen | |
| 4,339,484 A | 7/1982 | Harding | |
| 4,348,135 A | 9/1982 | St. Clair | |
| 4,375,806 A | 3/1983 | Nishman | |
| 4,384,135 A | 5/1983 | Cartwright et al. | |
| 4,385,430 A | 5/1983 | Bartels | |
| 4,388,966 A | 6/1983 | Spiegel | |
| 4,389,464 A | 6/1983 | Mühlratzer | |
| 4,394,859 A | 7/1983 | Drost | |
| 4,402,306 A * | 9/1983 | McElroy, Jr. | 126/619 |
| 4,405,010 A * | 9/1983 | Schwartz | 165/4 |
| 4,414,812 A | 11/1983 | Parry | |
| 4,416,264 A | 11/1983 | Herrick et al. | |
| 4,422,893 A | 12/1983 | Duchateau et al. | |
| 4,434,785 A | 3/1984 | Knudsen | |
| 4,435,043 A | 3/1984 | Mertens et al. | |
| 4,436,373 A | 3/1984 | Kirsch | |
| 4,441,318 A * | 4/1984 | Theckston | 60/527 |
| 4,445,499 A | 5/1984 | Platell | |
| 4,454,371 A | 6/1984 | Folino | |
| 4,459,972 A | 7/1984 | Moore | |
| 4,462,391 A | 7/1984 | Laussermair et al. | |
| 4,468,848 A | 9/1984 | Anderson et al. | |
| 4,496,787 A * | 1/1985 | Touchais et al. | 136/248 |
| 4,505,260 A | 3/1985 | Metzger | |
| 4,511,756 A | 4/1985 | Moeller et al. | |
| 4,515,148 A | 5/1985 | Boy-Marcotte et al. | |
| 4,520,794 A | 6/1985 | Stark et al. | |
| 4,526,005 A | 7/1985 | Laing et al. | |
| 4,553,531 A | 11/1985 | Rosende | |
| 4,559,926 A | 12/1985 | Butler | |
| 4,586,489 A | 5/1986 | Voll et al. | |
| 4,628,905 A | 12/1986 | Mills | |
| 4,643,212 A | 2/1987 | Rothrock | |
| 4,683,872 A * | 8/1987 | Fricker | 126/586 |
| 4,706,651 A * | 11/1987 | Yudow | 126/681 |
| 4,727,930 A * | 3/1988 | Bruckner et al. | 165/111 |
| 4,730,602 A | 3/1988 | Posnansky et al. | |
| 4,738,304 A | 4/1988 | Chalmers et al. | |
| 4,815,433 A | 3/1989 | Wild | |
| 4,815,443 A | 3/1989 | Vrolyk et al. | |
| 4,820,033 A | 4/1989 | Sick | |
| 4,820,395 A | 4/1989 | Angelini | |
| 4,890,599 A | 1/1990 | Eiden | |
| 5,113,659 A | 5/1992 | Baker et al. | |
| 5,128,115 A | 7/1992 | Glaztzmaier | |
| 5,138,832 A * | 8/1992 | Pande | 60/203.1 |
| 5,272,879 A | 12/1993 | Wiggs | |
| 5,275,150 A | 1/1994 | Lai | |
| 5,523,132 A | 6/1996 | Zhang et al. | |
| 5,542,409 A | 8/1996 | Sampayo | |
| 5,578,140 A | 11/1996 | Yogev et al. | |
| 5,643,423 A | 7/1997 | Kimock et al. | |
| 5,860,414 A | 1/1999 | Steinmann | |
| 5,862,799 A | 1/1999 | Yogev et al. | |
| 5,899,199 A | 5/1999 | Mills | |
| 5,931,158 A | 8/1999 | Buck | |
| 5,994,681 A | 11/1999 | Lloyd | |
| 6,000,211 A | 12/1999 | Bellac et al. | |
| 6,003,508 A | 12/1999 | Hoffschmidt et al. | |
| 6,035,850 A | 3/2000 | Deidewig et al. | |
| 6,065,284 A | 5/2000 | Horner et al. | |
| 6,066,187 A | 5/2000 | Jensen et al. | |
| 6,131,565 A | 10/2000 | Mills | |
| 6,141,949 A | 11/2000 | Steinmann | |
| 6,177,131 B1 | 1/2001 | Glaubitt et al. | |
| 6,227,280 B1 | 5/2001 | Wirth et al. | |
| 6,234,166 B1 | 5/2001 | Katsir et al. | |
| 6,279,312 B1 | 8/2001 | Hennecke | |
| 6,290,185 B1 * | 9/2001 | DeMars et al. | 244/171.1 |
| 6,344,272 B1 | 2/2002 | Oldenburg et al. | |
| 6,349,718 B1 | 2/2002 | Ven et al. | |
| 6,484,506 B1 | 11/2002 | Bellac et al. | |
| 6,530,369 B1 | 3/2003 | Yogev et al. | |
| 6,543,441 B2 | 4/2003 | Fünger et al. | |
| 6,594,984 B1 * | 7/2003 | Kudija et al. | 60/203.1 |
| 6,632,542 B1 | 10/2003 | Mahoney et al. | |
| 6,668,555 B1 | 12/2003 | Moriarty | |
| 6,668,820 B2 | 12/2003 | Cohen et al. | |
| 6,742,325 B2 * | 6/2004 | Kudija et al. | 60/204 |
| 6,752,434 B2 | 6/2004 | Cummins | |
| 6,783,653 B2 | 8/2004 | Mahoney et al. | |
| 6,906,842 B2 | 6/2005 | Agrawal et al. | |
| 6,941,759 B2 | 9/2005 | Bellac et al. | |
| 6,957,536 B2 * | 10/2005 | Litwin et al. | 60/641.8 |
| 6,959,993 B2 | 11/2005 | Gross et al. | |
| 6,971,756 B2 | 12/2005 | Vasylyev et al. | |
| 6,994,082 B2 | 2/2006 | Hochberg et al. | |
| 7,041,342 B2 | 5/2006 | Lohmeyer et al. | |
| 7,051,529 B2 | 5/2006 | Murphy et al. | |
| 7,055,519 B2 | 6/2006 | Litwin | |
| 7,140,181 B1 | 11/2006 | Jensen et al. | |
| 7,156,088 B2 | 1/2007 | Luconi | |
| 7,191,597 B2 | 3/2007 | Goldman | |
| 7,192,146 B2 | 3/2007 | Gross et al. | |
| 7,207,327 B2 | 4/2007 | Litwin et al. | |
| 7,296,401 B2 | 11/2007 | Asanuma et al. | |
| 7,296,410 B2 | 11/2007 | Litwin | |
| 7,299,633 B2 | 11/2007 | Murphy et al. | |
| 7,395,820 B2 | 7/2008 | Kuckelkorn | |
| 7,412,976 B2 | 8/2008 | Winston | |
| 7,432,488 B1 | 10/2008 | Hines et al. | |
| 7,479,350 B1 | 1/2009 | Neumann et al. | |
| 7,614,397 B1 * | 11/2009 | Munson, Jr. | 126/617 |
| 2002/0078945 A1 | 6/2002 | Funger et al. | |
| 2003/0137754 A1 | 7/2003 | Vasylyev et al. | |
| 2003/0173469 A1 | 9/2003 | Kudija, Jr. et al. | |
| 2004/0004175 A1 | 1/2004 | Nakamura et al. | |
| 2004/0074490 A1 | 4/2004 | Mills et al. | |
| 2004/0231716 A1 | 11/2004 | Litwin | |

| Publication No. | Date | Inventor |
|---|---|---|
| 2004/0261788 A1 | 12/2004 | Winston |
| 2005/0126170 A1 | 6/2005 | Litwin |
| 2005/0126560 A1 | 6/2005 | Litwin |
| 2005/0150225 A1 | 7/2005 | Gwiazda et al. |
| 2005/0189525 A1 | 9/2005 | Kuckelkorn et al. |
| 2005/0210876 A1* | 9/2005 | Karni et al. ............... 60/641.15 |
| 2005/0229924 A1 | 10/2005 | Luconi et al. |
| 2005/0279095 A1 | 12/2005 | Goldman |
| 2005/0279953 A1 | 12/2005 | Gerst |
| 2006/0107664 A1 | 5/2006 | Hudson et al. |
| 2006/0144393 A1 | 7/2006 | Le Lievre |
| 2006/0150967 A1 | 7/2006 | Hoelle et al. |
| 2006/0157050 A1 | 7/2006 | Le Lievre |
| 2006/0174866 A1* | 8/2006 | Zhang ......................... 126/651 |
| 2006/0181765 A1 | 8/2006 | Jorgensen et al. |
| 2006/0225729 A1 | 10/2006 | Litwin |
| 2006/0260314 A1 | 11/2006 | Kincaid et al. |
| 2006/0266039 A1 | 11/2006 | Skowronski et al. |
| 2007/0012041 A1 | 1/2007 | Goldman |
| 2007/0035864 A1 | 2/2007 | Vasylyev et al. |
| 2007/0084208 A1 | 4/2007 | Goldman |
| 2007/0157614 A1 | 7/2007 | Goldman |
| 2007/0157923 A1 | 7/2007 | Le Lievre |
| 2007/0209365 A1* | 9/2007 | Hamer et al. ................. 60/648 |
| 2007/0221208 A1 | 9/2007 | Goldman |
| 2007/0227573 A1 | 10/2007 | Hunter et al. |
| 2008/0000231 A1 | 1/2008 | Litwin et al. |
| 2008/0011290 A1 | 1/2008 | Goldman et al. |
| 2008/0029150 A1 | 2/2008 | Quero et al. |
| 2008/0034757 A1 | 2/2008 | Skowronski et al. |
| 2008/0038144 A1* | 2/2008 | Maziasz et al. ................. 420/45 |
| 2008/0060636 A1* | 3/2008 | Tuchelt ......................... 126/701 |
| 2008/0127647 A1 | 6/2008 | Leitner |
| 2008/0128017 A1 | 6/2008 | Ford |
| 2008/0134679 A1 | 6/2008 | Cavanaugh et al. |
| 2008/0184789 A1 | 8/2008 | Eck et al. |
| 2008/0256952 A1* | 10/2008 | Litwin et al. ................ 60/641.8 |
| 2008/0271731 A1 | 11/2008 | Winston |
| 2008/0289793 A1* | 11/2008 | Geiken et al. .................. 165/10 |
| 2008/0302314 A1 | 12/2008 | Gonzalez et al. |
| 2009/0032095 A1 | 2/2009 | Schultz et al. |
| 2009/0056699 A1 | 3/2009 | Mills et al. |
| 2009/0056701 A1 | 3/2009 | Mills et al. |
| 2009/0084760 A1 | 4/2009 | Mayer et al. |
| 2009/0101138 A1 | 4/2009 | Eck et al. |
| 2009/0107487 A1 | 4/2009 | Gee et al. |
| 2009/0107488 A1 | 4/2009 | Gee et al. |
| 2009/0107489 A1 | 4/2009 | Gee et al. |
| 2009/0139515 A1 | 6/2009 | Gee et al. |
| 2009/0199888 A1 | 8/2009 | Kuhn |
| 2009/0208761 A1 | 8/2009 | Silmy et al. |
| 2009/0322089 A1* | 12/2009 | Mills et al. ..................... 290/52 |

FOREIGN PATENT DOCUMENTS

| | | |
|---|---|---|
| DE | 29 45 908 A1 | 5/1981 |
| DE | 30 03 962 A1 | 8/1981 |
| DE | 94 17 466 U1 | 2/1995 |
| DE | 196 19 021 A1 | 11/1997 |
| DE | 196 51 645 A1 | 6/1998 |
| DE | 197 40 644 A1 | 3/1999 |
| DE | 199 32 646 A1 | 2/2000 |
| DE | 199 32 646 C1 | 2/2000 |
| DE | 198 54 391 A1 | 5/2000 |
| DE | 103 28 321 A1 | 1/2005 |
| DE | 10 2007 052 234 A1 | 4/2009 |
| EP | 0 012 037 A1 | 6/1980 |
| EP | 0 129 821 A2 | 1/1985 |
| EP | 0 129 821 A3 | 1/1985 |
| EP | 0 526 816 B1 | 2/1993 |
| EP | 0 151 045 A2 | 8/1995 |
| EP | 0 151 045 A3 | 8/1995 |
| EP | 0 815 401 B1 | 1/1998 |
| EP | 0 835 849 B1 | 4/1998 |
| EP | 0 856 104 B1 | 8/1998 |
| EP | 0 986 695 B1 | 3/2000 |
| EP | 1 056 978 B1 | 12/2000 |
| EP | 1 164 337 B1 | 12/2001 |
| EP | 2 093 518 A1 | 8/2002 |
| EP | 1 243 872 A2 | 9/2002 |
| EP | 1 243 872 A3 | 9/2002 |
| EP | 1 291 591 A2 | 3/2003 |
| EP | 1 291 591 A3 | 3/2003 |
| EP | 1 519 108 A1 | 3/2005 |
| EP | 1 537 921 A1 | 6/2005 |
| EP | 1 537 921 B1 | 6/2005 |
| EP | 1 598 608 A2 | 11/2005 |
| EP | 1 610 073 A2 | 12/2005 |
| EP | 1 746 363 A2 | 1/2007 |
| EP | 1 754 942 A1 | 2/2007 |
| EP | 1 764 565 B1 | 3/2007 |
| EP | 1 795 829 A2 | 6/2007 |
| EP | 1 801 517 A1 | 6/2007 |
| EP | 1 873 397 A2 | 1/2008 |
| EP | 1 930 587 A2 | 6/2008 |
| EP | 2 000 669 A2 | 12/2008 |
| EP | 2 093 520 A2 | 8/2009 |
| FR | 1 520 370 A | 4/1968 |
| FR | 2 391 420 A1 | 12/1978 |
| FR | 2 529 960 A | 1/1985 |
| GB | 2 037 977 A | 7/1980 |
| JP | 56-2441 A | 1/1981 |
| JP | 58-62460 A | 4/1983 |
| JP | 63-183346 A | 7/1988 |
| JP | 5-097179 A | 4/1993 |
| JP | 08-184063 A2 | 7/1996 |
| JP | 8 260912 A | 10/1996 |
| JP | 2000-97498 A | 4/2000 |
| JP | 2004-069197 A2 | 3/2004 |
| WO | WO-90/10182 | 9/1990 |
| WO | WO-95/21358 A1 | 8/1995 |
| WO | WO-95/25416 A1 | 9/1995 |
| WO | WO-96/29745 A1 | 9/1996 |
| WO | WO-96/30705 A1 | 10/1996 |
| WO | WO-97/01030 A2 | 1/1997 |
| WO | WO-97/01030 A3 | 1/1997 |
| WO | WO-97/14887 A1 | 4/1997 |
| WO | WO-98/55740 A1 | 12/1998 |
| WO | WO-99/42765 A1 | 8/1999 |
| WO | WO-99/64795 A2 | 12/1999 |
| WO | WO-99/64795 A3 | 12/1999 |
| WO | WO-00/33001 A1 | 6/2000 |
| WO | WO-01/61254 A1 | 8/2001 |
| WO | WO-01/72508 A1 | 10/2001 |
| WO | WO-02/02995 A2 | 1/2002 |
| WO | WO-02/02995 A3 | 1/2002 |
| WO | WO-02/12799 A2 | 2/2002 |
| WO | WO-02/12799 A3 | 2/2002 |
| WO | WO-02/25184 A1 | 3/2002 |
| WO | WO-02/075225 A2 | 9/2002 |
| WO | WO-02/075225 A3 | 9/2002 |
| WO | WO-02/098553 A1 | 12/2002 |
| WO | WO-2004/066401 A2 | 8/2004 |
| WO | WO-2004/066401 A3 | 8/2004 |
| WO | WO-2004/094924 A2 | 11/2004 |
| WO | WO-2004/094924 A3 | 11/2004 |
| WO | WO-2005/003646 A1 | 1/2005 |
| WO | WO-2005/003647 A1 | 1/2005 |
| WO | WO-2005/010225 A1 | 2/2005 |
| WO | WO-2005/071325 A1 | 8/2005 |
| WO | WO-2005/078360 A1 | 8/2005 |
| WO | WO-2005/088218 A1 | 9/2005 |
| WO | WO-2005/088218 C1 | 9/2005 |
| WO | WO-2005/088218 C2 | 9/2005 |
| WO | WO-2005/119136 A1 | 12/2005 |
| WO | WO-2006/000834 A1 | 1/2006 |
| WO | WO-2006/005303 A1 | 1/2006 |
| WO | WO-2006/008433 A1 | 1/2006 |
| WO | WO-2006/073357 A1 | 7/2006 |
| WO | WO-2007/022756 A2 | 3/2007 |
| WO | WO-2007/022756 A3 | 3/2007 |
| WO | WO-2007/031062 A1 | 3/2007 |
| WO | WO-2007/076282 A2 | 7/2007 |
| WO | WO-2007/076282 A3 | 7/2007 |
| WO | WO-2007/087680 A1 | 8/2007 |
| WO | WO-2007/104080 A1 | 9/2007 |
| WO | WO-2007/108976 A2 | 9/2007 |
| WO | WO-2007/108976 A3 | 9/2007 |
| WO | WO-2007/108976 A4 | 9/2007 |

| | | |
|---|---|---|
| WO | WO-2007/118223 A2 | 10/2007 |
| WO | WO-2007/118223 A3 | 10/2007 |
| WO | WO-2007/118223 A8 | 10/2007 |
| WO | WO-2007/147399 A2 | 12/2007 |
| WO | WO-2007/147399 A3 | 12/2007 |
| WO | WO-2008/006174 A1 | 1/2008 |
| WO | WO-2008/022409 A1 | 2/2008 |
| WO | WO-2008/027041 A1 | 3/2008 |
| WO | WO-2008/058528 A1 | 3/2008 |
| WO | WO-2008/058866 A1 | 3/2008 |
| WO | WO-2008/092194 A1 | 8/2008 |
| WO | WO-2008/092195 A1 | 8/2008 |
| WO | WO-2008/115305 A2 | 9/2008 |
| WO | WO-2008/115305 A3 | 9/2008 |
| WO | WO-2008/118980 A1 | 10/2008 |
| WO | WO-2008/121335 A1 | 10/2008 |
| WO | WO-2008/121335 C1 | 10/2008 |
| WO | WO-2008/121672 A1 | 10/2008 |
| WO | WO-2008/128237 A1 | 10/2008 |
| WO | WO-2008/128746 A2 | 10/2008 |
| WO | WO-2008/128746 A3 | 10/2008 |
| WO | WO-2008/153946 A2 | 12/2008 |
| WO | WO-2008/154521 A1 | 12/2008 |
| WO | WO-2008/154599 A1 | 12/2008 |
| WO | WO-2009/015388 A2 | 1/2009 |
| WO | WO-2009/015388 A3 | 1/2009 |
| WO | WO-2009/029275 A2 | 3/2009 |
| WO | WO-2009/029275 A3 | 3/2009 |
| WO | WO-2009/029277 A2 | 3/2009 |
| WO | WO-2009/029277 A3 | 3/2009 |
| WO | WO-2009/051595 A1 | 4/2009 |
| WO | WO-2009/106103 A1 | 9/2009 |
| WO | WO-2009/106103 A8 | 9/2009 |
| WO | WO-2009/106104 A1 | 9/2009 |
| WO | WO-2009/106104 A8 | 9/2009 |

OTHER PUBLICATIONS

The Aerospace Corporation. (Apr. 1977). "Evaluation of the FMC Line Cavity Central Receiver Concept," NTIS, pp. 1-26, table of conents, iii-iv.

Allani, Y. et al. (1997). "$CO_2$ Mitigation Through the Use of Hybrid Solar-combined Cycles," *Proceedings of the Third International Conference on Carbon Dioxide Removal*, Cambridge, MA, Sep. 9-11, 1996, *Energy Covers. Mgt.* 38(Suppl.):S661-S667.

Allani, Y. (1995). "Etude d' une novella centrale Electro-Thermo-solaire a cycle combine bi-combustible," *Journees Internationales de Thermique* (J1TH 95), vol. 2, 1 page. (English Machine Translation).

Allani, Y. (1992). "A Global Concept of a New Type of Solar Combined Cycle Duel Fuel Plant," Abstract, *presented at 6th International Symposium on Solar Thermal Concentrating Technologies*, Plataforma Solar de Almeria, Spain, Sep. 28-Oct. 2, 1992, pp. 939-943.

Allani, Y. et al. (1991). "Concept Global D'Une Nouvelle Centrale Solaire a Cycle of Combine and Dual Fuel," *Entropie* 164/165:121-122. (English Machine Translation).

American Society for Testing Materials International. (Date Unknown, cached version Mar. 19, 2008). "Meta-quartzite From the Rainbow Quarries," Screen shot, two pages.

Anonoymous. (Date Unknown, Web Archive Date Jul. 19, 2008). "Lake Cargelligo Solar Thermal Storage Project," <http://web.archive.org/web/2008071908141/http:/www.lloydenergy.com/prsentations.php>, last visited on Aug. 4, 2010, fifteen pages.

Anonoymous. (Date Unknown, Web Archive Date Jul. 19, 2008). "Cloncurry Solar Thermal Storage Project," <http://web.archive.org/web/20080719080141/http:/www.lloydenergy.com/presentations.php>, last visited on Aug. 4, 2010, fifteen pages.

Anonoymous. (Feb. 12, 2008). "Storing Energy Using Graphite," The Oil Drum: Australia and New Zealand, located at <http://anz.theoildrum.com/node/3608>, last visited on Sep. 1, 2009, seven pages.

Anonoymous. (Feb. 2008). "Electrical News, Quarterly Supplement for Electrical Engineers," *Electrical News* 15:1-12.

Anonoymous. (Date Unknown, Web Archive Date Jul. 19, 2008). "Frequently Asked Questions—Cloncurry Solar Power Pilot Project," located at <http://web.archive.org/web/20080719211253/www.lloydenergy.com/presentations/cloncurry+Solar+Thermal+Storaqe+Project+FAQ.pdf>, last visited Mar. 2, 2010, three pages.

Anonoymous. (Aug. 9, 2007). "Official Committee Hansard House of Representatives," located at <http://www.ah.gov.au/hansard/reps/committee/r10386.htm>, last visited on Mar. 2, 2010, eighteen pages.

Anonoymous. (May 9, 2007). "Cooma Company's $5 Million Grant," *Monaro Post*, one page.

Anonoymous. (May 8, 2007). "Cooma Project Receives $5 Million in Funding," Bombala Times located at <http://www.bombalatimes.com.au/news/local/news/General/Cooma-project-recieves-5_million-in-funding/267734.aspx>, last visited on Mar. 2, 2010, three pages.

Anonoymous. (May 7, 2007). "Lake Cargelligo Chosen as Solar Energy Project Trial Site," located at <http://www.abc.net.au/news/newsitems/200705/s1916027.htm>, last visited on Feb. 26, 2010, one page.

Anonoymous. (Jun. 1978). "Application of Solar Technology to Today's Energy Needs," Chapter VIII, Office of Technology Assessment, located at <http://www.princeton.edu/~ota/disk3/1978/7802_n.html>, last visited on Mar. 3, 2010, pp. 245-326.

Anonoymous. (Jun. 1978). "Application of Solar Technology to Today's Energy Needs," Chapter IX, Office of Technology Assessment, located at <http://www.princeton.edu/~ota/disk3/1978/7802_n.html>, last visited on Mar. 3, 2010, pp. 329-389.

Anonoymous. (Jun. 1978). "Application of Solar Technology to Today's Energy Needs," Chapter XI, Office of Technology Assessment, located at <http://www.princeton.edu/~ota/disk3/1978/7802_n.html>, last visited on Mar. 3, 2010, pp. 429-483.

Anonoymous. (1971). "Effect of High Temperature on Hardened Concrete," pp. 1-3.

ASTM International. (2008). "Standard Specification for Electroplated Engineering Nickel Coatings," ASTM International, pp. 1-7.

Bennett, J.E. et al. (Jul. 1976). "Investigations of an Electrodeposited Tin-Nickel Alloy," *J. Eleectrchem. S.* 123(7):999-1003.

Bernhard, R. et al. (Mar. 2008). "Linear Fresnel Collector Demonstration on the PSA. Part I—Design; Construction and Quality Control," *presented at the Proceedings of the 14th SolarPACES International Symposium*, Las Vegas, Nevada, Mar. 4-7, 2008, ten pages.

Birnbaum, J. et al. (Sep. 2008). "A Concept for Future Parabolic Trough Based Solar Thermal Power Plants," *ICPWS XV*, Berlin, Germany, Sep. 8-11, 2008, ten pages.

Bopp, P. et al. (Jun. 1996). "Solare Vorwärmung zur Brennstoffeinsparung in Fossil Befeuerten Kraftwerken," *Solarenergie* 48(6):26-32. (English Machine Translation).

Brosseau, D.A. et al. (Jul. 2004). "Testing Thermocline Filler Materials and Molten-Salt Heat Transfer Fluids for Thermal Energy Storage Systems Used in Parabolic Trough Solar Power Plants," SAND2004-3207, pp. 1-95.

Bruhn, M. et al. (1996). "Criteria for the Assessment of Concepts for the Use of Solar Energy in Combine Heat and Power," *Proceedings of EuroSun '96*, pp. 1695-1700.

Bruhn, M. (1994). Einsatz von Solarenergie in der zentralen Wärme-Kraft-Kopping, *HLH Bd.* 45(11):573-576. (Machine Translation).

Buie, D. et al. (Sep. 2002). "Optical Considerations in line Focus Fresnel Concentrators," *11th Proceedings of the 11th Solar PACES International Symposium on Solar Thermal Concentrating Technologies*, Sep. 3-6, 2002, Zurich, Switzerland, located at <http://www.physics.usyd.edu.au/app/solar/publications/index.html>, last visited Aug. 27, 2010, pp. 1-6.

Burbidge, D. et al. (2000). "Stanwell Solar Thermal Power Project," *10th Symposium on Solar Thermal Concentrating Technologies*, Sydney, Australia, six pages.

Burley, S.M. et al. eds. (1994). Proceedings of Solar '94, The 1994 American Solar Energy Society Annual Conference, San Jose, CA, Jun. 25-30, 1994, pp. vi-ix.

Buschle, J. et al. (Date Unknown). "Latent Heat Storage for Process Heat Applications," pp. 1-8.

Carden, P.O. (1977). "Energy Corradiation Using the Reversible Ammonia Reaction," *Solar Energy* 19(4):365-378.

Carvalho, P.A. et al. (2000). "High-Resolution Transmission Electron Microscopy Study of Discontinuously Precipitated $Ni_3Sn$," *ACTA Matr.* 48:4203-4215.

Copeland et al. (Nov. 1983). "For Water/Steam, Organic Fluid, and Air/Brayton Solar Thermal Collector Receivers," in *Comparative Ranking of Thermal Storage Systems*, vol. 1, Solar Energy Research Institute, Golden, Colorado, 116 pages.

Darnell, J.R. et al. (1980). "A Solar-Fossil Combined Cycle Power Plant," presented at AS/ISES 1980 Proceedings of the 1980 Annual Meeting American Section of the International Solar Energy Society, Inc., Jun. 2-6, 1980, Phoenix, Arizona, pp. 563-567.

Deleon, P. et al. (Dec. 1979). "Solar Technology Application to Enhanced Oil Recovery," Solar Energy Research Institute, U.S. Department of Energy Contact No. EG 77 C 01 4042, 110 pages.

Dey, C.J. (2004). "Heat Transfer Aspects of an Elevated Linear Absorber," *Solar Energy* 76:243-249.

Dey, C.J. et al. (2002). "Operation of a CLFR Research Apparatus," *Proceedings of the 38th Annual Conference of the Australian and New Zealand Energy Society, SOLAR 2000—From Fossils to Photons*, Brisbane, Australia, Nov. 28, 2000 through Dec. 1, 2000, pp. 516-527.

Di Canio, D.G. et al., (Apr. 1979). "Line Focus Solar Thermal Central Receiver Research Study: Final Report for Period Apr. 30, 1977-Mar. 31, 1979," FMC Corporation: Santa Clara, CA, U.S. Department of Energy Solar Energy Under Contract EY-76-C03-1246, DOE/ET 20426-1, 316 pages.

Dubberly, L.J. et al. (Nov. 1983). "Comparative Ranking of Thermal Storage Systems," in *Comparative Ranking of Thermal Storage Systems*, vol. 11, Solar Energy Research Institute, Golden, Colorado, 294 pages.

Eck, M. (2007). "Direct Solar Steam in Parabolic Troughs—Simulation of Dynamic Behavior," presented at the 2007 Parabolic Trough Technology Workshop, Golden, Colorado, Mar. 8-9, 2007, twenty-five pages.

Eckstock. (2006). "Session Descriptions," *Proceedings of ECKSTOCK, The Richard Stockton College New Jersey*, Pomona, New Jersey, May 31-Jun. 2, 2006 Pomona, New Jersey, fifty-five pages.

Electric Power Research Institute. (Oct. 2008). "Solar Augmented Steam Cycles for Coal Plants," *Electric Power Research Institute*, two pages.

Elsaket, G. (Sep. 2007). "Simulating the Integrated Solar Combined Cycle for Power Plants Application in Libya," Thesis for G. Elsaket for Cranfield University, 116 pages.

Francia, G. (1968). "Pilot Plants of Solar Steam Generating Stations," *Solar Energy* 12:51-64.

FMC Corporation. (Feb. 1977). "Solar Thermal Central-Receiver Research Study," DOE/ET/20426-T6, pp. 1-109, Appendix A,B,C,D, 160 pages.

Goebel, O. et al. (Sep. 2002). "Parabolic Trough Collector with Foldable Reflector FC1: Design, Test Programme and Experiences" *Proceedings of the 11th SolarPACES International Symposium on Concentrated Solar Power and Chemical Technologies*, Zurich, Switzerland, Sep. 4-6, 2002, five pages.

Gorman, D.N. (Jul. 1987). "Assessment of Central Receiver Solar Thermal Enhanced Oil Recovery Systems," Thermal Power Systems, Contactor Report DR 0302-6, 119 pages.

Häberle, A. et al. (Sep. 2002). "The Solarmundo Line Focussing Fresnel Collector. Optical and Thermal Performance and Cost Calculations," located at: <http://www.ise.fraunhofer.de/veroeffentlichungen/nach-jahrgaengen/2002/the-solarmundo-line-focussing-fresnel-collector-optical-and-thermal-performance-and-cost-calculations>, last visited Jul. 27, 2009, eleven pages.

Hasson, J. et al. (2006, e-pub. Apr. 17, 2006). "Electrodeposited Ni—Sn Intermetallic Electrodes for Advanced Lithium Ion Batteries," *Journal of Power Sources* 160:1336-1341.

Hollis, S. (Aug. 2006). "A New Thermal Energy Storage System," presented at the 82nd Annual EESA Conference Trade Exhibition—Electricity 2006, At the Flick of a Switch, Aug. 2006, Melbourne, Australia, twenty pages.

Hu, E.J. et al. (2003). "Solar Power Boosting of Fossil Fuelled Power Plants," *Proceedings ISES Solar World Congress*, Goteborg. Sweden, Jun. 14-19, 2003, seven pages.

International Search Report mailed on Jun. 25, 2009, for PCT Application No. PCT/US2008/010230, filed on Aug. 27, 2008, five pages.

International Search Report mailed on May 6, 2009, for PCT Application No. PCT/US2008/007419, filed on Jun. 13, 2008, three pages.

International Search Report mailed on Apr. 8, 2009, for PCT Application No. PCT/US2008/066185, filed on Jun. 6, 2008, three pages.

International Search Report mailed on Sep. 26, 2008, for PCT Application No. PCT/US2008/007098, filed on Jun. 6, 2008, three pages.

International Search Report mailed on Oct. 15, 2007, for PCT Application No. PCT/AU2007/001232, filed on Aug. 27, 2007, three pages.

International Search Report mailed on May 3, 2007, for PCT Application No. PCT/AU2007/000268, filed on Mar. 2, 2007, two pages.

International Search Report mailed on May 24, 2005, for PCT Application No. PCT/AU2005/000208, filed on Feb. 17, 2005, two pages.

Jance, M.J. (Jun. 2003). "Experimental and Numerical Analysis of Combined Convection and Radiation Heat Transfer Within a Stratified Trapezoidal Cavity," University of New South Wales, 219 pages.

Jance, M.J. et al. (2000). "Natural Convection and Radiation within an Enclosed Inverted Absorber Cavity: Preliminary Experimental Results," *ANZSES Annual Conference—From Fossils to Photons*, Brisbane, Australia, 2000, seven pages.

Katumba, G. et al. (2008, e-pub. Dec. 10, 2007). "Solar Selective Absorber Functionality of Carbon Nanoparticles Embedded in $SiO_2$, ZnO and NiO Matrices," *Phys. Stat. Sol.* 5(2):549-551.

Katumba, G. et al. (Jul. 2006). "Selective Solar Absorbers: A Cost Effective Solution for Access to Clean Energy in Rural Africa," *SAIP 2006*, Jul. 5, 2006, Capetown, South Africa, pp. 1-9.

Katumba, G. et al. (2006). "Solar Selective Absorber Functionality of Carbon Nanoparticles Embedded in $Si_2$, ZnO and NiO Matrices," *SAIP 2006*, University of Zimbabwe, Harare, Zimbabwe, twenty-nine pages.

Kennedy, C. (Apr. 2008). "Session:CSP Advanced Systems: Optical Materials Organization: National Renewable Energy Laboratory," NREL, Apr. 22-24, 2008, Austin, Texas, pp. 1-30.

Kennedy, C. et al. (Mar. 2007). "Progress Toward Developing a Durable High-Temperature Solar Selective Coating," *2007 Parabolic Trough Technologies Workshop*, Mar. 8-9, 2007, Golden, Colorado, one page.

Kennedy, C. et al. (Jan. 2005). "Development and Testing of High-Temperature Solar Selective Coatings," presented at *the 2004 DOE Solar Energy Technologies*, Oct. 25-28, 2004, Denver, Colorado, 5 pages.

Kennedy, C.E. et al. (Mar. 2008). "Progress to Develop an Advanced Solar-Selective Coating," *14th Bieninal CSP Solar PACES Symposium*, Mar. 4-7, 2008, Las Vegas, Nevada, pp. 1-9.

Kennedy, C.E. (Oct. 10, 2007). "Advances in Concentrating Solar Power Collectors: Mirrors and Solar Selective Coating," *AIMCAL*, Scottsdale, Arizona, Oct. 10, 2007, pp. 1-69.

Kennedy, C.E. (Jul. 2002). "Review of Mid-to High-Temperature Solar Selective Absorber Materials," Technical Report—NREL, 58 pages.

Künstle, K. et al. (1994). "Solar Powered Combined Cycle Plant," *Power-Gen Europe '94*, May 17-19, 1994, Cologne, Germany, 6/7:134-151.

Laing, D. (Mar. 9, 2007). "Storage Development for Direct Stream Generation Power Plants," *Parabolic Trough Technology Workshop*, Golden, CO, Mar. 9, 2007, pp. 1-21.

Laing, D. (Mar. 8, 2007). "Concrete Storage Development for Parabolic Trough Power Plants," *Parabolic Trough Technology Workshop*, Golden, CO, Mar. 8, 2007, pp. 1-17.

Lefrois, R.T. (Date Unknown). "Active Heat Exchange System Development for Latent Heat Thermal Energy Storage," Honeywell, Inc., pp. 338-353.

Le Liévre, P. et al. (2006). "Design of 6.5 MW Solar Thermal Electricity Plant with Zero Fossil Fuel Backup," *ANZSES Annual Conference—Clean Energy?—Can Do!*, Canberra, Australia, Sep. 13-15, 2006, seven pages.

Lippke, F. (1994). "Numerische Simulation der Absorberdynamkik von Parabolrinnen-Solar-kraftwerken mit direkter Dampferzeugung," VDI 6(307):1-115. (Machine Translation).

Lovegrove, K. et al. (2004). "Developing Ammonia Based Thermochemical Energy Storage for Dish Power Plants," *Solar Energy* 76:331-337.

Lovegrove, K. et al. (1996). "Endothermic Reactors for an Ammonia Based Thermo-chemical Solar Energy Storage and Transport System," *Solar Energy* 56(4):361-371.

Marko, A. (Jul./Aug. 1995). "Verbesserung fossilgefeuerter Dampfkraftwerke durch solare Wämezufuhr," *BWK* 47(7/8):303-308. (Machine Translation).

Marko, A. et al. (Mar. 1994). "Solar Ybteerstützte Konventionellle Kraftwerke für Mittel-und Südeuropa," BWK Bd. 46(5):247-253. (Machine Translation).

Mertins, M. et al. (Jul. 1, 2004). "Geometry Optimization of Fresnel-Collectors with Economic Assessment," pp. 1-8.

Mills, D. et al. (Aug. 2005). "Cheaper Than Coal?" *International Solar Energy Society Solar World Congress*, Orlando, Florida, Aug. 6-12, 2005, eight pages.

Mills, D. (2004, e-published Apr. 24, 2003). "Advances in Solar Thermal Electricity Technology," *Solar Energy* 76:19-31.

Mills, D. et al. (2004). "Design of a 240 $MW_e$ Solar Thermal Power Plant," present at Eurosun 2004 Conference, located at <http://www.ausra.com/pdfs/Design240MWsolarthermalpowerplant_Mills_2004>, last visited on Jul. 20, 2009, eight pages.

Mills, D. et al. (Aug. 2004). "The Future of Solar Thermal," *Proceedings of the 8th Renewable & Sustainable Power Conference*, Alice Springs, Australia, Aug. 12-13, 2002, twenty pages.

Mills, D. et al. (Sep. 2002). "Lower Temperature Approach for Very Large Solar Powerplants," *presented at 11th SolarPaces*, Sep. 4-6, 2002, Zurich, Switzerland, six pages.

Mills, D.R. et al. (2006). "Compact Linear Fresnel Reflector Progress," *Solar PACES 2006*, pp. 1-7.

Mills, D.R. et al. (Feb. 2006). "Multi-tower Line Focus Fresnel Array Project," *Journal of Solar Energy Engineering* 128(1):118-120.

Mills, D.R. et al. (Dec. 2004). "First Results from Compact Linear Fresnel Reflector Installation," *Proceedings Solar 2004, Australian and New Zealand Energy Society*, Murdoch Dec. 2004, seven pages.

Mills, D.R. et al. (Mar. 2004). "Case Study: Low Cost Solar Thermal Power Development in NSW," *Proceedings at Enviro 2004*, Mar. 28, 2004, seven pages.

Mills, D.R. et al. (Mar. 2003). "Multi-Tower Line Focus Fresnel Arrays," *Proceedings of ISEC 2003: International Solar Energy Conference*, Manua Kea Resort, Hawaii Island, Hawaii, USA, Mar. 16-18, 2003, six pages.

Mills, D.R. et al. (Nov. 2003). "Solar Preheating of the Liddell Coal-fired Powerplant," *ANZSES Annual Conference 2003*, Nov. 26-29, 2003, pp. 600-604.

Mills, D.R. et al. (2002). "Project Proposal for a Compact Linear Fresnel Reflector Solar Thermal Plant in the Hunter Valley," located at <http://solar1.mech.unsw.edu.au/glm/papers/Mills_projectproposal_newcastle.pdf>, last visited on Jul. 20, 2009, six pages.

Mills, D.R. et al. (Mar. 2000). "Compact Linear Fresnel Reflector Solar Thermal Powerplants," *Solar Energy* 68(3):263-283.

Mills, D.R. et al. (1997). "Advanced Fresnel Reflector Powerplants—Performance and Generating Costs," *Proceedings of Solar 97—Australia and New Zealand Solar Energy Society*, paper 84, pp. 1-9.

Morrison, G.L. (Nov. 2006). "Large Scale Solar Thermal Electricity," *Australia-China Energy Symposium*, Sydney, Australia, Nov. 2006, twenty-five pages.

Morrison, G.L. et al. (2001). "Water-in-Glass Evacuated Tube Solar Water Heaters," *Proceedings of ISES 2001 Solar World Congress*, Adelaide, Australia, Nov. 25-30, 2001, pp. 545-550.

Morrison, G.L. et al. (1999). "Solar Thermal Power Systems—Stanwell Power Station Project," *ANZSES Annual Conference*, Geelong, Australia, 1999, ten pages.

National Renewable Energy Laboratory. (Sep. 2000). "Survey of Thermal Storage for Parabolic Trough Power Plants," Period of Performance: Sep. 13, 1999-Jun. 12, 2000, 61 pages.

Nava, P. et al. (Mar. 2007). "Trough Thermal Storage—Status Spring 2007," *NREL/DLR Trough Workshop*, Denver, CO, pp. 1-19.

NIR News. (Oct./Nov. 2005). "A Celebration of Near Infrared Spectroscopy," *NIR News* 16(7):32 pages.

Nitarski, M.J. et al. (Jul. 2000). "Combined Radiation and Natural Convection in a Trapezoidal Cavity Absorber: An Experimental Study," *Proceedings of the Seventh Australasian Heat and Mass Transfer Conference*, James Cook University, Townsville, Jul. 2000, pp. 251-256.

Odeh, S. et al. (Dec. 1998). "Hydrodynamic Model for Horizontal and Inclined Solar Absorber Tubes for Direct Steam Generation Collectors," *13th Australasian Fluid Mechanics Conference*, Dec. 13-18, 1998, Monash University, Melbourne, Australia, four pages.

Odeh, S. et al. (Oct. 1998). "Performance of Horizontal and Inclined Direct Steam Generation Trough Solar Collectors," *ANZSES 1998*, Oct. 1998, Perth, Australia, eight pages.

Pacheco, J.E. et al. (May 2002). "Development of Molten-Salt Thermocline Thermal Storage System for Parabolic Trough Plants," *Journal of Solar Energy Engineering* 124:153-159.

Pacheco, J.E. et al. (Apr. 2001). "Development of a Molten-Salt Thermocline Thermal Storage System for Parabolic Trough Plants," *Journal of Solar Energy Engineering* 124:153-159.

Passo, J. (Nov. 2007). "Moisture Depth Profiling in Paper Using Near-Infrared Spectroscopy," *VIT Technical Research Centre Finland*, 204 pages.

Peterson, J. (Dec. 2008). "Super-Concrete to Store Solar Power Works," *TreeHugger*, located at <http://www.treehugger.com/files/2008/12/thermal-storage-concrete.php>, last visited on Jul. 15, 2000, pp. 1-5.

Pye, J. (Date Unknown). "Compact Linear Fresnel Reflector," 7 pages.

Pye, J. et al. (Jul. 2003). "Convection Inside the Cavity Receiver of the *CLFR* Concentrating Solar Power System," *7th Natural Convection Workshop*, Sydney, Australia, 2003, two pages.

Pye, J.D. et al. (2004). "Steam-circuit Model for the Compact Linear Fresnel Reflector Prototype," *ANZSES Solar 2004: Life, the Universe and Renewables*, Nov. 30 through Dec. 3, 2004, Perth, Western Australia, pp. ten pages.

Pye, J.D. et al. (Nov. 2003). "Transient Modelling of Cavity Receiver Heat Transfer for the Compact Linear Fresnel Reflector," *ANZSES Solar 2003*, Melbourne, Australia, Nov. 23-29, 2003, nine pages.

Pye, J.D. et al. (Jun. 2003). "Modelling of Cavity Receiver Heat Transfer for the Compact Linear Fresnel Reflector," *ISES World Congress*, Jun. 14-19, 2003. eight pages.

Risenenkampf, W. et al. (2001). "New High-Tin Phase Found in Electrolytick Sn—Ni Deposits," *Journal of Materials Science* 36:4633-4636, Abstract Only.

Reynolds, D.J. (2005). "A Thermal and Hydrodynamic Model for a Compact Linear Fresnel Reflector-Type Solar Thermal Collector," University of New South Wales, 291 pages.

Reynolds, D.J. et al. (2004). "An Experimental and Computational Study of the Heat Loss Characteristics of a Trapezoidal Cavity Absorber," *Solar Energy* 76:229-234.

Reynolds, D.J. (2002). "A Hydrodynamic Model for a Line-Focus Direct Steam Generation Solar Collector," *Proceedings of Solar 2002—Australia and New Zealand Solar Energy Society—Solar Harvest*, Newcastle, Australia, 2002, six pages.

Reynolds, D.J. et al. (Nov. 2001). "An Experimental and Computational Study of the Heat Loss Characteristics of a Trapezoidal Cavity Absorber," *Proceedings of ISES 2001 Solar World Congress*, Adelaide, Australia, Nov. 25-30, 2001, pp. 919-924.

Reynolds, D.J. (2000). "Heat Transfer in a Trapezoidal Cavity Absorber for a Solar Thermal Collector," *ANZSES Annual Conference—Renewable Energy Transforming Business*, Brisbane, Australia, 2000, pp. 547-555.

Reynolds, D.J. et al. (Jun. 2000). "Combined Radiation and Natural Convection in a Trapezoidal Cavity Absorber," *Proceedings 7th Australasian Heat Transfer and Mass Transfer Conference*, Townsville, Australia, Jun. 2000, as posted on <http:/solar1.mech.unsw.edu.au/glm/galm-papers/7AHMTC_reynolds.pdf>, last visited on Aug. 7, 2009, six pages.

Schramek, P. et al. (2004). "Heliostats for Maximum Ground Coverage," *Energy* 29:701-713.

Solar Energy Research Institute. (Nov. 1989). "Phase-Change Thermal Energy Storage. Final Subcontract Report on the Symposium Held Oct. 19-20, 1988, Helendale, California," U.S. Department of Energy Contract No. DE-AC0283CH10093, 151 pages.

SolarPACES. (Sep. 2009). "SolarPACES 2009 Program" *SOLARPACES 2009*, Sep. 15-18, 2009, Berlin Germany, nineteen pages.

Solar Progress (Oct. 2004). "Solar Progress Renewable Energy for Australasia," 25(3):1-35.

Stanley, N.E. (Apr. 1982). "An Overview of Engineering and Agricultural Design Considerations of the Raft River Soil-Warming and Heat Dissipation Experiment," EG&G Idaho, Inc., U.S. Department of Energy Idaho Operations Office Under DOE Contact No. DE-AC07-76ID01570, pp. 1-23.

Stine, W.B. et al. (1985). "Power Cycles for Solar Applications," Chapter 12 in *Solar Energy Fundamentals and Design with Computer Applications*, John Wiley & Sons, New York, New York, pp. 281-334.

Stine, W.B. et al. (1985). "Solar Thermal Projects," Chapter 14 in *Solar Energy Fundamentals and Design with Computer Applications*, John Wiley & Sons, New York, New York, pp. 364-396.

Stroll, R. (Nov. 1977). "Collections," Chapter VIII in *Solar Technology to Today's Energy Needs*, pp. 245-301.

Tamaura et al. (Jun. 2006). "A Novel Beam Down System for Solar Power Generation with Multi-ring Central Reflectors and Molten Salt Thermal Storage," presented at 13$^{th}$ International Symposium on Concentrating Solar Power and Chemical Energy Technologies, Jun. 20-23, 2006, Seville, Spain, located at <http://www.fundacionsener.es/EPORTAL_DOCS/GENERAL/FILE-cw7646d431b8c543d7b45a/ANOVELBEAM-DOWNSYSTEM.pdf>, last visited on Mar. 2, 2010, eight pages.

Tamme, R. (Jun. 2008). "TES for Process Heat and Power Generation," Symposium "Material Development for Thermal Energy Storage," *Phase Change Materials and Chemical Reaktions*, Jun. 4-6, 2008, Bad Tölz, Germany, pp. 1-25.

Tamme, R. (Oct. 2007). "Future Storage System," *World Solar Power*, Seville, Spain, Oct. 24-26, 2007, pp. 1-22.

Tamme, R. (Jun. 21, 2007). "Storage Technology for Process Heat Applications," *Preheat Symposium*, Jun. 21, 2007, Frelburg, Germany, pp. 1-24.

Tamme, R. (Feb. 2006). "Thermal Energy Storage: Concrete & Phase Changes TES," *2006 Parabolic Trough Technology Workshop*, Feb. 13, 2006, Incline Village, Nevada, pp. 1-28.

Tanner, A.R. (Nov. 2003). "Application of Underground Thermal Energy Storage for Solar Thermal Power Generation in New South Wales," School of Aerospace, Mechanical and Mechatronic Engineering, The University of Sydney, 124 pages.

Tegehall, P-E. (Mar. 2006). "Review of the Impact of Intermetallic Layers on the Brittleness of Tin-Lead and Lead-Free Solder Joints," IVF Project Report 06/07, pp. 1-63.

Tesfamicharel, T. (2000). "Characterization of Selective Solar Absorbers. Experimental and Theoretical Modeling" *ACTA Universitatis Upsaliensis Uppsala*, pp. 4-79.

Tomlinson, W.J. et al. (1990). "Substrate Roughness Deposit Thickness and the Corrosion of Electroless Nickel Coatings," *Journal of Material Science* 25:4972-4976.

Turkenburg, W.C. et al. (2000) "Renewable Energy Technologies," Chapter 7 in World Energy Assessment: Energy and the Challenge of Sustainability, Washington, D.C., UNDP, pp. 220-272.

Turner, R.H. (Dec. 15, 1979). "High Temperature Thermal Energy Storage in Steel and Sand," DOE/NASA/0100-79-1, 95 pages.

Turner, R.H. (1978). *High Temperature Thermal Energy Storage, Including a Discussion of TES Intergrated Into Power Plants*, Part I and Part II, The Franklin Institute Press, Philadelphia, Pennsylvania, 51 pages.

Turner, R.H. et al. (1978). "High Temperature Thermal Energy Storage in Moving Sand," *Proceedings of the 13$^{th}$ Intersociety Energy Conversion Engineering Conference*, San Diego, CA, Aug. 20-25, 1978, pp. 923-927.

U.S. Appl. No. 61/007,926, filed Aug. 27, 2007, for Mills et al.
U.S. Appl. No. 60/934,549, filed Jun. 13, 2007, for Mills et al.
U.S. Appl. No. 60/933,648, filed Jun. 6, 2007, for Mills et al.
U.S. Appl. No. 60/933,615, filed Jun. 6, 2007, for Mills et al.
U.S. Appl. No. 60/933,637, filed Jun. 6, 2007, for Mills et al.
U.S. Appl. No. 11/895,869, filed Aug. 27, 2007, for Mills et al.
U.S. Appl. No. 12/012,821, filed Feb. 5, 2008, for Mills et al.
U.S. Appl. No. 12/012,829, filed Feb. 5, 2008, for Mills et al.
U.S. Appl. No. 12/012,920, filed Feb. 5, 2008, for Mills et al.
U.S. Appl. No. 12/135,039, filed Jun. 6, 2008, for Mills et al.
U.S. Appl. No. 12/135,124, filed Jun. 6, 2008, for Mills et al.

Von Tobias Mauelshagen. "Technologie der Solar Power am beispieleines 10MWe Fresenelkraftwerkes," Solar Power Group Workshop, Solar Power Group GmbH, Nov. 20, 2008, Berlin, Germany, located at <http://www.mss-csp.info/cms/upload/pdf/Berlin_Nov_2008/7.Solar_Power_Group_-_Prsentation_Mauelshagen_Workshop_Berlin_20112008.pd,> last visited on Aug. 27, 2010. pp. 1-31. (English Translation Included), Nov. 2008.

Written Opinion mailed on May 6, 2009, for PCT Application No. PCT/US2008/007419, filed on Jun. 13, 2008, six pages.

Written Opinion mailed on Apr. 8, 2009, for PCT Application No. PCT/US2008/066185, filed on Jun. 6, 2008, seven pages.

Written Opinion mailed on Jun. 30, 2008, for PCT Application No. PCT/US2008/010230, filed on Aug. 27, 2008, ten pages.

Written Opinion mailed on May 24, 2005, for PCT Application No. PCT/AU2005/000208, filed on Feb. 17, 2005, three pages.

Wynne, B.E. et al (Jan. 1972). "The Transformation on Annealing of the Metastable Electrodeposit, $NiSn_x$ to Its Equilibrium Phases," *Metallurgical Transactions* 3:301-305.

Zöllner, V.G. et al. (1989). "Rechnerische Simulation von Heizkraftprozessen als Instrument zur Parametervariation and Optimierung," FWI 18(5):466-471. (Translation of the Abstract Only.).

Zoschak, R.J. et al. (1974). "Studies of the Direct Input of Solar Energy to a Fossil Fueled Central Station Steam Power Plants," *Solar Energy* 17:297-305.

International Search Report mailed on Sep. 26, 2008, for PCT Application No. PCT/US2008/007098, filed on Jun. 6, 2008, seven pages.

Written Opinion mailed on Sep. 26, 2008, for PCT Application No. PCT/US2008/007098, filed on Jun. 6, 2008, seven pages.

U.S. Appl. No. 12/157,067, filed Jun. 6, 2008, for Mills.
U.S. Appl. No. 60/933,574, filed Jun. 6, 2007, for Mills et al.
U.S. Appl. No. 60/933,619, filed Jun. 6, 2007, for Mills.
U.S. Appl. No. 60/933,620, filed Jun. 6, 2007, for Mills et al.
U.S. Appl. No. 12/157,879, filed Jun. 13, 2008, for Mills.

International Search Report mailed on Aug. 31, 2004, for PCT Application No. PCT/AU2004/000884, filed on Jul. 1, 2004, two pages.

International Search Report mailed on Jun. 27, 2011, for PCT/US2008/007130, filed on Jun. 6, 2008, six pages.

Kribus, A. (2002). "A High-Efficiency Triple Cycle for Solar Power Generation," *Solar Energy* 72(1):1-11.

Written Opinion mailed on Jun. 27, 2011, for PCT/US2008/007130, filed on Jun. 6, 2008, eight pages.

* cited by examiner

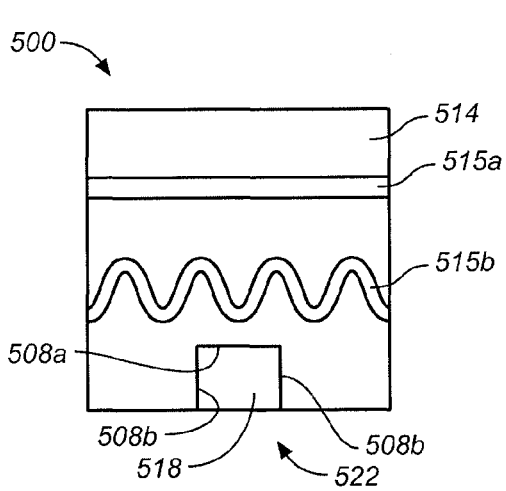
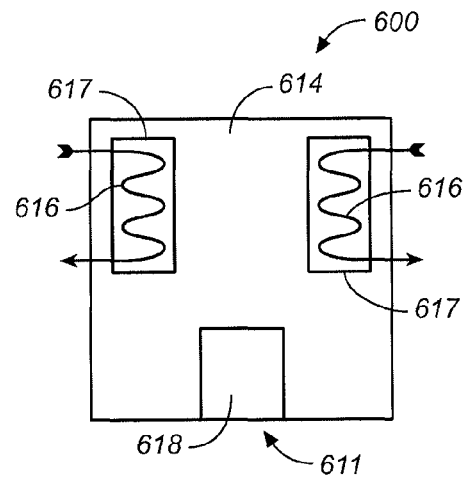
FIG. 5    FIG. 6
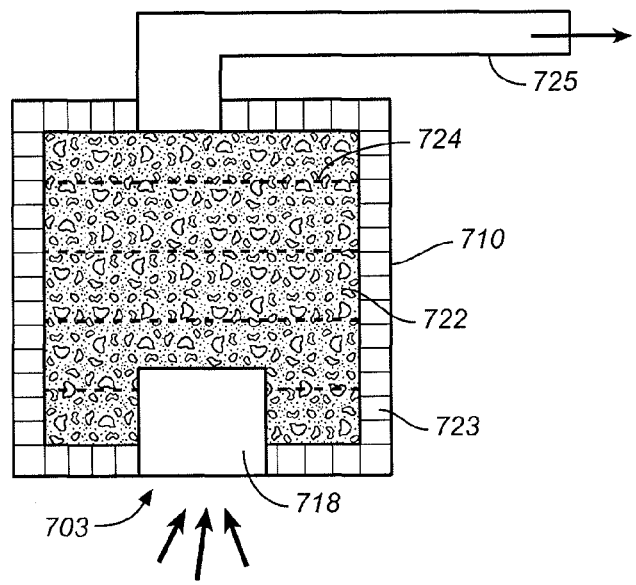
FIG. 7

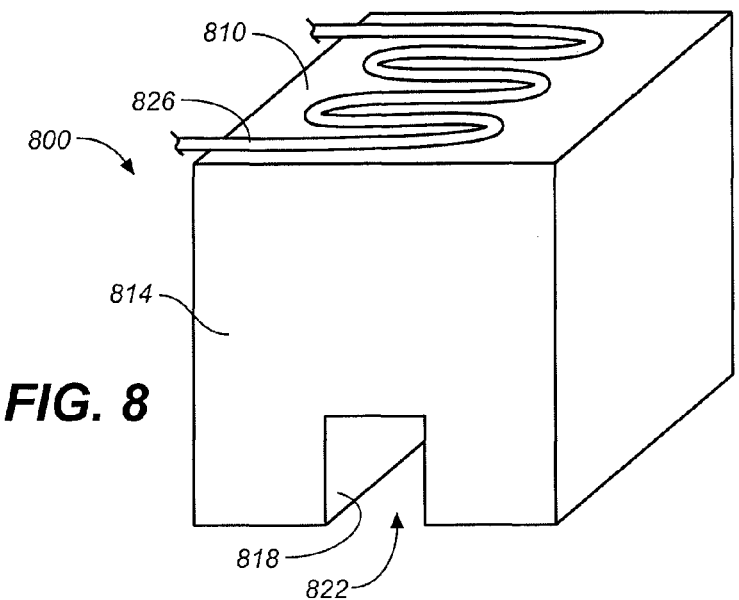
FIG. 8
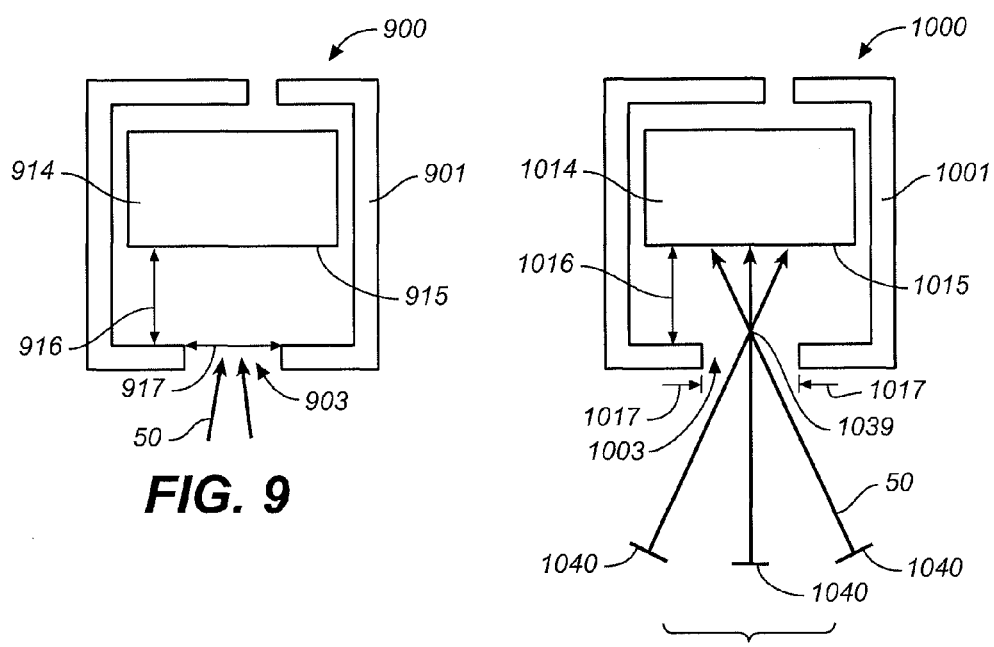
FIG. 9      FIG. 10

INTEGRATED SOLAR ENERGY RECEIVER-STORAGE UNIT

CROSS REFERENCE TO RELATED APPLICATIONS

This application claims the benefit of priority from U.S. Provisional Patent Application Ser. No. 60/933,620, entitled "Integrated Solar Energy Receiver-Storage Unit," filed Jun. 6, 2007, which is hereby incorporated by reference herein in its entirety. This application is related to U.S. patent application Ser. No. 12/157,067, entitled "Combined Cycle Power Plant," filed concurrently herewith, which claims the benefit of priority from U.S. Provisional Patent Application Ser. No. 60/933,619, entitled "Combined Cycle Power Plant," filed Jun. 6, 2007, each of which is hereby incorporated by reference in its entirety.

FIELD

This application relates to a receiver for a solar energy system, and in particular to an integrated solar energy receiver-thermal energy storage unit. The receivers and integrated units disclosed here may be suitable for receiving concentrated solar radiation from a field of heliostat-type reflectors. A receiver, e.g., an integrated receiver-thermal energy storage unit, in some of its applications, may be employed as a tower-mounted receiver or elevated in some other manner. In other applications, a receiver, e.g., an integrated receiver-thermal energy storage unit, may be located elsewhere than on a tower, for example at or near ground level, e.g., when employed as a secondary receiver.

BACKGROUND

Tower-mounted receivers are well known in the context of solar energy collector systems and may take various forms, depending upon whether they are employed, for example, in the transfer of radiative energy to photovoltaic cells or in the transfer of thermal energy to a heat exchange fluid such as water, a molten salt or air.

More efficient tower-mounted receivers may incorporate a cavity having a relatively small aperture through which concentrated (reflected) radiation is focused from a field of reflectors and, in receivers that have relevance to the present application, provision is made for the transporting of thermal energy that is generated within the receiver as a consequence of absorption of solar energy in the wall of the cavity. However, these receivers do not make specific provision for integrated storage of thermal energy that is generated in the receiver by absorption of solar energy.

A solar energy receiver that does provide for integrated thermal energy storage is disclosed in U.S. Pat. No. 4,815,443, issued Mar. 28, 1989, and assigned to Rockwell International Corporation ('443 patent). However, the receiver as described in the '443 patent has specific application to a space station. There, the receiver comprises a first (helical-form) fluid conduit that is located within a cavity of the receiver, and a second fluid conduit that is located within a thermal energy storage layer that is formed from a metallic material that surrounds the cavity. The first conduit and the thermal energy storage layer are both exposed to solar radiation that is focused into the cavity during insolation periods. During these in-sun periods, a first heat exchange fluid is cycled through the first conduit. A second heat exchange fluid is cycled through the second conduit during in-shadow periods. The first and second heat exchange fluids are then used alternately for heat exchange with a working fluid that is used to energize an associated heat engine.

Also of relevance to the present application is a thermal energy storage system as disclosed in International Patent publication WO2005/088218, by Larkden Pty Ltd, in which a substantially solid body of graphite is employed to store heat energy for subsequent release to a fluid through surface-mounted heat exchangers. However, in this system, as disclosed, thermal energy is generated in the graphite body by electrical resistance heating in a cavity within the graphite body.

A need exists for improved receivers to be used with tower solar arrays (e.g., a multi-tower solar array), and in particular, receivers that include integrated thermal energy storage.

SUMMARY

The present application describes receivers for use in solar energy collector systems and solar-powered electrical energy generating plants. In general, the receivers comprise a solar radiation absorbing core that converts absorbed solar radiation to thermal energy. The core comprises a refractory material to allow the receivers to operate continuously at high temperatures reached by absorbing concentrated solar radiation. The thermal energy so generated in the core may be stored in the receiver for a transitory period, or for a more extended period. Thus, a receiver may function as an integrated receiver-thermal energy storage unit, and the terms "receiver" and "integrated receiver-thermal energy storage unit," and "integrated receiver-storage unit" are used interchangeably herein. A working fluid, e.g., air, may be employed to extract stored thermal energy from the receivers.

Also disclosed herein are methods and systems related to the receivers described in general terms above. For example, methods for effecting heat exchange utilizing the receivers are disclosed here. In addition, various solar energy collector systems incorporating the receivers are also disclosed. Further, variations of solar-powered electrical energy generating plants using the receivers are described.

The term "refractory material" is to be understood in the context of the present application as one that is substantially opaque to solar radiation and remains substantially stable (physically and/or chemically) when exposed to temperatures (for example of the order of about 800° C. to about 2500° C., or about 800° C. to about 3000° C., e.g., at least about 800° C., at least about 1000° C., at least about 1200° C., at least about 1400° C., at least about 1600° C., at least about 1800° C., at least about 2000° C., at least about 2200° C., or at least about 2500° C.) that may be established with absorption of concentrated solar radiation. Such "refractory material" may, for example, comprise a refractory metal, a ceramic, a cermet, or any combination thereof. Refractory materials may for example comprise alumina, silica, carbon, magnesia, zirconia, silicon carbide, titanium carbide, tantalum carbide, chromium carbide, niobium carbide, zirconium carbide, molybdenum disilicide, calcium oxide, graphite, chromite, dolomite, magnesite, quartzite, aluminium silicate, tungsten, molybdenum, niobium, tantalum, rhenium, beryllium, and combinations thereof.

As used herein, the terms "primarily" and "major part" are meant to mean at least about 50%. Thus a receiver element that is composed primarily of a refractory material comprises at least about 50% by any measure (e.g., by weight or volume) of that refractory material. The term "pipe" as used herein is meant to encompass any tube, conduit or the like. Pipes may have any configuration, e.g., may have a round cross-sectional shape, or a polygonal cross-sectional shape, may be straight, bent, or curved, and may be joined to other pipes, valves, end caps, junctions, vessels, and the like. A "pipe manifold" as used herein is meant to refer to an arrangement of multiple pipes, including any associated pipe joints, valves, end caps, junctions, and the like. A "receiver body" and "body" refer to a portion of a receiver that comprises a solar radiation absorbing refractory material. In some cases, the refractory material may be primarily contained in or confined to a subportion of a body, e.g., an interior subportion, which may be referred to herein as a "receiver core" or a "core." In other instances, the refractory material may not be localized within the body (e.g., the body as a whole may comprise the refractory material), in which case the receiver body and the receiver core are synonymous. As used herein "vertical" and "horizontal" are used in reference to ground. Further, descriptions such as "substantially horizontal," "substantially vertical," "substantially opaque," and "substantially stable" and the like are meant to encompass the relevant properties and minor deviations therefrom, e.g., deviations of about 10%, or about 5% or less. Thus, a "substantially horizontal" aperture may be generally parallel to ground, e.g., within about +/−10 degrees or less, within about +/−8 degrees, within about +/−5 degrees, within about +/−3 degrees, or within about +/−1 degree of a horizontal direction, relative to ground. A material that remains "substantially stable" is one that is not exposed to conditions that would degrade the material prematurely. For instance, a ceramic or other material would be substantially stable if maintained within normally accepted operating temperatures or below the temperature at which e.g. spalling or other surface and/or internal damage occurs. It should also be noted that the terms "a" "an" and "the" are meant to encompass singular as well as plural referents unless the context clearly indicates otherwise. Numerical ranges as used herein are meant to be inclusive of any endpoints indicated for the ranges, as well as any number included in the ranges.

Some variations of the receivers comprise a core composed primarily of a refractory material. The core is configured to absorb solar radiation that has been directed through an aperture in the receiver, so that the absorbed solar radiation is converted to thermal energy stored in the core. The core also comprises one or more fluid passageways for conveying a working fluid through and/or around the core to facilitate extraction of stored thermal energy from the core. These receivers may be tower-mounted or mounted at or near ground level, e.g., for a solar array comprising a beam down receiver configuration. The working fluid used with these receivers may for example comprise primarily air.

The refractory material in a receiver may be any refractory material that is substantially opaque to solar radiation and remains substantially stable when exposed to temperatures that are established with absorption of concentrated solar radiation. The refractory material may be selected from the group of refractory metals, ceramics, and cermets. Some of the refractory materials may be able to withstand continuous operation at temperatures of at least about 1000° C., or at least about 1200° C., or even higher. The refractory material in the receivers may comprise more than one refractory component. A refractory material used in a receiver may be selected from the group consisting of alumina, silica, carbon, magnesia, zirconia, silicon carbide, titanium carbide, tantalum carbide, chromium carbide, niobium carbide, zirconium carbide, molybdenum disilicide, calcium oxide, graphite, chromite, dolomite, magnesite, quartzite, aluminum silicate, tungsten, molybdenum, niobium, tantalum, rhenium, beryllium, and combinations thereof.

An incident surface of the core that is to receive and absorb solar radiation directed through the receiver aperture may have any suitable orientation and configuration within the receiver body. Thus, in some variations, an incident surface of the core may be substantially horizontal. An incident surface of a core in certain receivers may be substantially vertical. Some receiver core may comprise both substantially horizontal and substantially vertical incident surfaces. A receiver with an inclined aperture may also be inclined so as to be approximately parallel to the receiver aperture Further, the bulk of the solar radiation absorbing refractory core may have a variety of configurations. For example, the core may comprise an exterior cladding layer, which may in some cases protect an interior portion of the refractory core underneath the cladding layer. Further, the one or more passageways in the core may have a variety of arrangements. For example, one or more passageways may be directed radially outward from an inner portion of the core to a peripheral portion of the core. In certain variations, the core may comprise an aggregated material, and the aggregated material may have a particle size and packed density such that the working fluid can permeate through passageways between interstitial voids in the aggregate. Variations of cores may comprise one or more metal structures, e.g., a mesh or fins, that may distribute heat through the core.

The aperture may be situated anywhere in the receiver, e.g., in a receiver housing or in the core itself. In some variations of receivers that are designed to be tower mounted, the aperture may be a substantially horizontally oriented aperture that is situated on a lower surface of the receiver, so as to comprise a downward facing opening of the receiver. Such an arrangement may reduce convective losses through the aperture, and may eliminate the need for an expensive quartz window, and also eliminate losses due to such window. However, in certain variations, a window, e.g., a quartz window, may cover or partially cover the aperture.

In some variations, a displacement between the aperture through which solar radiation is directed and the core may be adjusted to determine an energy density or intensity of the solar radiation that is incident on the core. For example, the displacement between the aperture and the core may be adjusted to increase an energy collection efficiency of the receiver. In certain variations, a displacement between the aperture and the core may be selected to image an array of reflectors that direct solar radiation through the aperture.

Other types of receivers are disclosed herein. These receivers are tower mounted. The receiver comprises a substantially horizontally oriented aperture situated on a lower surface of the body so as to comprise a downward facing opening. The receivers also include a solar radiation absorbing core that comprises a refractory material. The core is disposed within the body and above the aperture so that solar radiation directed through the aperture is incident on the core for bulk absorption in the core to generate stored thermal energy in the core. Some variations of these tower mounted receivers may comprise at least one passageway in and/or around the core for conveying a working fluid, e.g., a working fluid that comprises primarily air, through and facilitating extraction of thermal energy from the core. A window, e.g., a quartz window, may but need not be used to at least partially cover the aperture.

The refractory core may have any suitable composition. For example, in some variations the core may be primarily composed of a refractive material that is substantially opaque to solar radiation and remains substantially stable when exposed to temperatures that are established with absorption of concentrated solar radiation. The refractory material may be selected from the group of refractory metals, ceramics, and cermets. The refractory materials may for example be able to withstand continuous operation at temperatures of at least about 1000° C., or at least about 1200° C., or even higher. The refractory material in these receivers may comprise more than one refractory component.

The core may have a variety of configurations. For example, in some variations an incident surface of the core designed to receive and absorb incident solar radiation may be substantially horizontal. In other variations, an incident surface of the core may be substantially vertical. Further, a displacement between an incident surface of the core may be adjusted, e.g., to adjust a solar radiation energy density or intensity on the core, and/or to increase an energy collection efficiency of the receiver. In certain variations, a displacement between the aperture and a substantially horizontal incident surface of the core may be selected to image or approximately image an array of reflectors directing reflected solar radiation through the aperture.

The solar radiation absorbing core itself may have a variety of configurations, and may for example comprise an exterior cladding layer, which may in some cases protect an interior portion of the core underneath the cladding layer. Further, if the core comprises one or more passageways configured to convey a working fluid through and/or around the core, those one or more passageways may have a variety of arrangements. For example, one or more passageways may be directed radially outward from an inner portion of the core to a peripheral portion of the core. The core may comprise an aggregate, and one or more fluid passageways in the core may comprise interconnected interstitial spaces between particles of the aggregate. Cores in some instances may comprise one or more metal structures, e.g., a mesh or fins, that in operation may distribute heat through the core.

Other variations of receiver-storage units (receivers) for use in a solar energy collector system are described here. These receivers comprise a body having at least a major part of its volume composed of a refractory material, and a cavity provided within the body and having an aperture through which concentrated solar radiation is in use focused to impinge on a wall of the cavity, and at least one passageway located within the body for conveying a working fluid through and facilitating extraction of thermal energy from the body.

Methods for effecting energy exchange to generate thermal energy from solar energy are also described here. Some variations of these methods comprise directing concentrated solar radiation through a receiver aperture, so that the solar radiation is incident on a receiver core, where the core is composed primarily of a refractory material that is capable of absorbing solar radiation to generate thermal energy. The methods further comprise transferring thermal energy from the core to a working fluid by passing the working fluid through one or more passageways in and/or around the core. The methods may comprise directing concentrated solar radiation through the aperture to be incident on the core so that the core reaches a continuous operating temperature of about 1000° C. or higher, or about 1200° C., or even higher. The working fluid used in these methods may for example comprise primarily air.

The methods may comprise passing a working fluid through any one of a variety of configurations of passageways. For example, methods may comprise flowing the working fluid through one or more passageways that are directed radially outward from an interior region of the core to a peripheral region of the core, or one or more serpentine or helical passageways through the core. In certain methods, the core may comprise an aggregate, and the methods may comprise flowing the working fluid through one or more passageways comprising interconnected interstitial spaces in the aggregate.

These methods may be used in context of tower mounted receivers, or receivers mounted at or near ground level, e.g., receivers in a solar array configured in a beam down arrangement. For either tower mounted or ground mounted receivers, a cross-sectional dimension of an aperture and/or a displacement between the aperture and an incident surface of the core may be adjusted, e.g., to adjust an energy density or intensity on a core and/or to increase a collection efficiency of the receiver. For example, the methods may comprise concentrating and directing the solar radiation through the aperture so that a point of maximum energy density or intensity occurs at or before the aperture, e.g., so that solar radiation is relatively divergent and less intense as it is incident on the core, alleviating local overheating.

In certain variations, the methods may comprise directing the concentrated solar radiation to be incident on a substantially horizontal surface of the core, or to be incident on a substantially vertical surface of the core, or to be incident on both a substantially horizontal surface and a substantially vertical surface of the core. Certain ones of the methods may comprise imaging or approximately imaging an array of reflectors on a substantially horizontal incident surface of the core, where the array of reflectors is used to direct solar radiation through the aperture of the receiver to be incident on that substantially horizontal core surface.

In the methods, any type of array of reflectors may be employed to direct concentrated solar radiation through the aperture to be incident on the core. For example, an array comprising fixed horizontal axis and/or fixed vertical axis heliostats may be used.

Additional methods for effecting energy exchange are disclosed herein. These methods comprise directing concentrated solar radiation through a substantially horizontally oriented aperture in a lower portion of a body of a tower-mounted receiver so that the solar radiation is incident on and absorbed by a core disposed within the body to generate thermal energy in the core. The methods further comprise transferring thermal energy from the core to a working fluid, e.g., a working fluid that comprises primarily air.

The methods may comprise transferring thermal energy from the core to the working fluid by flowing the working fluid through one or more fluid passageways in and/or around the core. Such passageways may have a variety of configurations. For example, one or more passageways may be directed radially between an internal portion of the core and a peripheral region of the core, or through a serpentine passageway through the core. In some variations, the core may comprise an aggregate, and the methods may include flowing the working fluid through one or more passageways comprising interconnected interstitial spaces in the aggregate.

Further, the methods may comprise adjusting a displacement between the aperture and an incident surface of the core so as to adjust an energy density or intensity on the core and/or an efficiency of the receiver.

Additional variations of methods for effecting energy exchange are provided. These methods comprise directing concentrated solar radiation into an apertured cavity within a body of a receiver from reflectors within one or more fields of reflectors. The body has at least a major part of its volume composed of a refractory material in which thermal energy is generated by bulk absorption of radiative energy. The body also has at least one passageway located therein. The methods further comprise transferring the thermal energy to a working fluid by passing the working fluid though one or more passageways within the body.

Variations of solar energy collector systems are described here. In general, the solar energy collector systems comprise an array of reflectors configured to direct incident solar radiation to one or more of the receivers described herein, and a pipe manifold configured to contain a first working fluid. In operation, the pipe manifold conveys the first working fluid that has extracted stored thermal energy from the one or more receivers so that the heated first working fluid can be used in generating electrical energy. The first working fluid may be any suitable working fluid, but in some cases the first working fluid may comprise primarily air. In these systems, the reflectors may be any suitable reflectors, but in some instances, the reflectors may have one or more two-axis heliostats having fixed horizontal axes and/or one or more two-axis heliostats having fixed vertical axes. The reflectors may be configured as tower-mounted receivers in some arrays, or the receivers may be mounted at or near ground level, e.g., in arrays utilizing beam down configurations.

Certain solar energy collector systems may include more than one receiver. In these systems, the receivers may be the same as or different from each other. Where more than one receiver is present in a solar energy collector system, at least one of the reflectors, e.g., a heliostat, may be configured to pivot so as to direct incident solar radiation to any of the multiple receivers, e.g., depending on a position of the sun and/or seasonal conditions.

Certain solar energy collector systems may comprise a heat exchanger, where the heat exchanger is configured to transfer thermal energy contained in the first working fluid to a second working fluid. Any suitable working fluids may be used as the first working fluid and as the second working fluid in these systems. The first working fluid may for example comprise primarily air, and the second working fluid may comprise steam, water, and/or a steam/water mixture.

Variations of electrical energy generating plants are provided here. In general, the plants may comprise one or more first or "top" thermodynamic cycle heat engines (e.g. a Brayton cycle heat engine) in which a receiver as described herein is used to heat a compressed working fluid so that the heated compressed fluid can be expanded to generate electrical energy. That is, the plants may have a first compressor configured to compress a first working fluid, a first heating stage configured to heat the compressed working fluid, and a first turbine configured to expand the compressed heated working fluid to drive an electrical generator. In these plants, the first heating stage comprises at least one of the solar energy receivers described herein. Thus, some plants may comprise a receiver that comprises an aperture through which concentrated solar radiation is directed and a core comprising a refractory material, wherein the core absorbs incident solar radiation to generate thermal energy that is stored therein. That stored thermal energy in the core may then be used to heat the compressed first working fluid. The first working fluid may be any suitable working fluid, but in many instances may comprise primarily air.

The receivers used in these plants may be configured as tower-mounted receivers, or may be mounted at or near ground level. In instances where a receiver is tower mounted, the plants may comprise an array of reflectors, e.g., heliostats, directing solar radiation to the tower mounted receiver to heat the compressed working fluid. In instances where a receiver is mounted at or near ground level, the plants may comprise an array of heliostats directing solar radiation to an elevated reflector that, in turn, redirects the solar radiation down to the receiver.

A receiver may be mounted so an outer surface and e.g. substantially planar core surface are each horizontal, or a receiver may be positioned so that an outer surface is inclined and faces toward a solar field below it in a manner that solar radiation is directed totally or partly from one side of the tower through the aperture and is incident on the core.

A receiver may be configured such that a beam from a field of reflectors converges to its smallest size in the vicinity of the aperture, and the core of the receiver is positioned a sufficient distance from the aperture to reduce incident light intensity so that the peak temperature on the core material is within normal operating range for the material and the core material remains substantially physically and chemically stable. The beam may form an image on the core and e.g. on a substantially planar surface of the core, similar to an image formed by a camera such as a pinhole camera. Image intensity may be substantially uniform as long as the surface of the core is not angled and/or curved with respect to the field of reflectors so that an approximate image of the reflector field is formed on the core, and the image is not skewed or distorted to an extent that peak intensity in a portion of the image creates a "hot spot" that exceeds to a significant extent the highest temperature in the temperature range of normal operation for the material.

Certain of these electrical energy plants may comprise one or more second or "bottom" thermodynamic cycle heat engines, in which the second cycle heat engine utilizes waste thermal energy recovered from the first working fluid following its expansion to heat a second working fluid powering the second cycle heat engine. The second working fluid may be any suitable working fluid, but in many cases, may comprise steam, water, and/or a water/steam mixture. The second cycle may be a Rankine cycle. Any type of Rankine cycle heat engine may be used, e.g., a Rankine cycle in which the second working fluid is compressed, heated by the recovered waste energy following expansion of the first working fluid, and then expanded through one or more turbines to drive an electrical generator.

The following description provides exemplary embodiments of receiver-storage units for use in solar energy collector systems and electrical power plants. The description is provided in reference to the accompanying drawings.

BRIEF DESCRIPTION OF THE DRAWINGS

The invention will be more fully understood from the following description of an exemplary embodiment of a receiver-storage unit for use in a solar energy collector system, the description being provided with reference to the accompanying diagrammatic drawings.

FIG. 5 shows a sectional elevation view of yet another embodiment of a receiver.

FIG. 6 provides a sectional elevation view of still another embodiment of a receiver.

FIG. 7 shows a sectional elevation view of a variation of a receiver in which the core comprises a particulate material.

FIG. 8 illustrates an example of a receiver-storage unit including a heat exchanger in thermal contact with the solar radiation absorbing core of the receiver.

FIG. 9 illustrates a variation of a receiver in which a displacement between a solar radiation absorbing core and an aperture in the receiver body can be varied.

FIG. 10 depicts a receiver having an aperture and a core.

DETAILED DESCRIPTION

Figure 1:
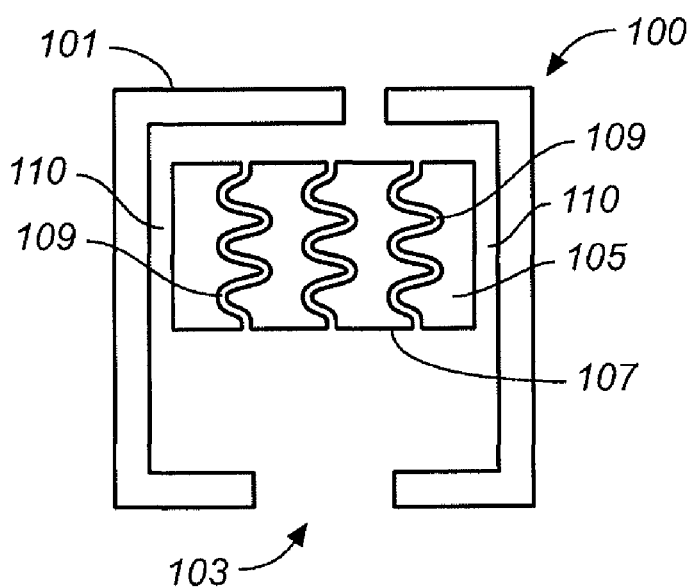
FIG. 1 shows an example of a receiver comprising a refractory core.

The present application discloses receivers for use in a solar energy collector system. In general, the receivers comprise a solar radiation absorbing core or body that converts the absorbed radiation to thermal energy. The solar radiation absorbing core comprises a refractory material capable of operating continuously at high temperatures resulting from the absorption of concentrated solar radiation. The core may then store the thermal energy so generated briefly, e.g., for a transient period such as less than about 15 minutes, or for a more extended period, e.g., about 15 minutes or longer, about 1 hour or longer, or for several hours. A working fluid, e.g., a fluid comprising primarily air such as ambient air, may be employed to extract stored thermal energy from the receivers. Thus, a receiver may in some instances function as an integrated receiver-thermal energy storage unit. Also provided herein are methods and systems related to the receivers, e.g., methods for effecting heat exchange utilizing the receivers. Further, various solar energy collector systems and solar-driven electrical power plants incorporating the receivers are described.

It should be noted that any of the receivers may be used in combination with any of the methods, solar energy collection systems, or electrical power plants, and one or more aspects or features of the solar energy collection systems may be combined with one or more aspects or features of the electrical power plants.

Several variations of receivers comprising a solar radiation absorbing body or core are disclosed here. As stated above, the core comprises a refractory material. The core may in some examples be composed primarily of one or more refractory materials. The receivers comprise an aperture, located for example in a receiver housing or in the core itself, to control a region of irradiation, a surface of irradiation, and/or an energy density or intensity of irradiation on the core. Variations of receivers may be tower mounted (or otherwise elevated on a hill, building, wall, etc.), e.g., for use in a tower solar array (e.g., a multi-tower solar array), so that solar radiation is directed generally upward through the aperture to be incident on the solar radiation absorbing core. In certain variations, the receivers may be mounted at or near ground level, e.g., for use in a solar array configured for beam down operation, so that solar radiation is directed generally downward through the aperture to be incident on the core. In certain variations, the receivers may be inclined between horizontal and vertical facing toward the solar field below so that solar radiation is directed totally or partly from one side of the tower through the aperture is incident on the core.

In a solar energy collector system, solar radiation is directed through the receiver aperture to be incident on a solar radiation absorbing receiver core by reflectors (e.g., heliostats) within one or more reflector fields. Thermal energy may be generated in the body of the receiver by bulk absorption and/or absorption of the radiative energy at the core's surface, or by absorption in cavity or channel structures on the surface of the core medium. The thermal energy may in some variations be transferred to a working fluid, e.g., to a working fluid passing through one or more fluid passage (s) within and/or around the body or core. Thermal energy may be transferred to the working fluid either simultaneously with the generation and storage of the energy in the body or core, or optionally following a transitional period of storage of the thermal energy in the body or core. Thus, the receivers may be employed to accommodate transitory loss or reduction of solar energy impingement in a receiver body, e.g., due to periods of low insolation.

Depending upon the refractory material employed, a receiver body or core may in some cases be formed as a substantially solid unitary body, with or without binding materials, e.g., by a moulding or other similar such process. For example, a refractory material may be cast and then fired to form a desired size and shape to be assembled in a block-like matrix. Alternatively or in addition, some receiver bodies or cores may be constructed from bonded blocks comprising one or more refractory materials, for example from bonded blocks comprising aluminum oxide. A body may be cut, or otherwise machined or processed to form a desired size, shape and/or configuration.

As a further form of construction, some variations of receivers may comprise a core comprising (e.g., composed primarily of) a particulate refractory material. Such particulate refractory material may comprise any refractory material described herein or otherwise known, and in some instances may comprise more than one refractory material. For example, a refractory material may comprise an unbonded heat-conductive (mineral) earthen material such as quartzite. In such variations, a core comprising one or more particulate refractory materials may be located within a shell or housing. For example a receiver may comprise a container containing one or more particulate refractory materials, or a bale of a loose refractory material in the form of chunks or pieces, rocks, stones, gravel (each of which may or may not be crushed), or even finer particles, or any combination thereof. The shell or housing itself may comprise a refractory material. For example, such a shell or housing may comprise or be formed from bonded blocks comprising a refractory material, e.g., bonded blocks comprising aluminum oxide. A refractory material incorporated into a shell or housing of a receiver body may be the same or different as a refractory material incorporated into a receiver core. In certain variations, one or more metal structures such as fins, a mesh, or grid-like structures may be positioned within a receiver core and/or body, e.g., to promote spreading of absorbed thermal energy throughout the fluid within a receiver, and/or to promote channeling of thermal energy into one or more particular regions of a core or body. Also, in some variations, e.g., in this latter form of construction, the core may be contained within a casing, e.g., a metal casing. A spacing, which may or may not be at least partially filled with a thermally insulating material, may be provided between a core and a casing.

An incident surface of a receiver core or receiver body configured to receive and absorb solar radiation may have any desired configuration, e.g., an incident surface may be substantially planar or contoured. If generally planar, an incident surface may be for example substantially parallel to a plane defined by an aperture admitting solar radiation into the receiver, or substantially orthogonal to a plane defined by the aperture. In certain variations, a receiver body or core may comprise a cavity into which concentrated solar radiation is directed to be incident on one or more cavity walls.

An incident surface of a receiver body or core may in some embodiments be substantially unclad such that the incident surface will, in use of the receiver, be exposed to concentrated solar radiation that is beamed through the aperture of the receiver. In certain variations, an incident surface may be optionally clad, e.g., with a protective lining comprising a thermally conductive material that may for example inhibit ablation and/or sublimation of the underlying refractory material. Thus, for those receiver bodies or cores comprising a cavity into which solar radiation is directed, one or more cavity walls may be clad as described. A cladding, if present, may in certain variations be removably secured to an incident surface (e.g., a cavity wall in a cavity). For example, such removable claddings may be employed where it is desired to replace the cladding, e.g., for periodic replacement and/or for repair.

If present, a cavity in a receiver body or receiver core may be configured in various ways, for example as a cylindrical cavity, as a generally cubic-shaped cavity, or any other type of polyhedral shaped cavity. A cavity may in certain instances be configured so as to induce reflection, e.g., total internal reflection of incoming radiation.

During those periods when it is not necessary that the aperture be open, for example to permit air flow into the receiver (e.g., into a cavity in a receiver body), the aperture may optionally be closed with or at least partially covered by a window, e.g., a quartz window. In some cases it may be desired to omit a window, e.g., to eliminate reflective losses from the window which may be on the order of about 5% to about 10%. In those situations, a receiver may be configured to reduce convective thermal losses by positioning a downward opening aperture in a substantially horizontal orientation.

As stated above, some variations of receivers comprise one or more fluid passageways extending in and/or around a receiver body or core. Such passageway or, more usually, passageways in and/or around a receiver body and/or receiver core (if distinct from the receiver body) may be arranged so as to extend generally linearly through the body or core, as the case may be. Optionally, e.g., when it is desired to increase a residence time of a working fluid (heat exchange fluid) in the body or core, one or more fluid passageways may follow a curvilinear, serpentine, or circuitous path in and/or around a receiver body or core. If a receiver body or core comprises one or more particulate refractory materials, particle sizes and/or a packing density may be optionally selected to provide natural passageways through the body or core; that is, passageways at least partially defined by interconnected interstices between the particles. A working fluid or heat exchange fluid (e.g., a gas such as ambient air) may be forced (e.g., pumped or drawn) through the one or more passageways to extract stored thermal energy from the receiver core or body. The heat exchange fluid may access the one or more passageways in a variety of manners. For example, a heat exchange fluid (which may comprise primarily air) may be forced into a cavity, which may be open to one or more fluid passageways. In other variations, a heat exchange fluid may enter one or more passageways without entering a cavity, e.g., via a side access or top access.

In one particular embodiment, a plurality of passageways may be provided within a receiver body, with each passageway (which may optionally comprise an interstitial passageway as above mentioned) radiating outwardly to an exterior or peripheral region of the body from an interior region, e.g., a cavity. With this arrangement, ambient air may be employed as the heat exchange fluid and be drawn or forced through the cavity, through the radiating passageways and into a collecting chamber or the like. The resulting heated air may then be used as a working fluid or be used to transfer thermal energy to a (further) working fluid such as water, steam, or a mixture of water and steam.

When a gaseous working fluid (e.g., a working fluid that comprises primarily air (e.g., ambient air)) is used to extract stored thermal energy from a solar radiation absorbing core or body, as above described, the receiver may optionally be interposed between a compressor turbine and a turbo-generator, with the compressor being employed to force compressed gas (e.g., air) into the receiver and the turbo-generator being driven by high temperature-high pressure air following its passage through the body or core of the receiver. Thus, the integrated receiver-storage unit may optionally be integrated with a turbo-compressor and a gas turbine to operate in a Brayton cycle. Non-limiting examples of Brayton cycle heat engines and combined cycle power plants incorporating integrated receiver-storage units as described here are provided in U.S. patent application Ser. No. 12/157,067, entitled "Combined Cycle Power Plant" and filed concurrently herewith, and in U.S. Provisional Patent Application Ser. No. 60/933,619, entitled "Combined Cycle Power Plant", filed Jun. 6, 2007, each of which has already been incorporated by reference herein in its entirety.

In some embodiments, a passageway, or if more than one, passageways may optionally comprise a liner, e.g., a thermally conductive liner such as a carbon, graphite, or metal liner. A liner, if present, may be positioned within a hollow passageway or chamber within a receiver body or receiver core. In some circumstances, one or more spacer elements may be employed, e.g., to maintain separation of the liner from the core or body. By maintaining such separation between a liner and a passageway it may be possible to reduce or avoid problems such as passageway blockage flowing from differential coefficients of expansion between the liner and the receiver body or core.

Receivers may have any suitable dimensions, and a solar radiation absorbing body or core in a receiver may have any suitable dimensions. For example, one or more receiver and/or receiver body or core dimensions may be determined by an amount of solar radiation directed at the receiver, a thermal energy storage capacity desired, the composition of the receiver body or core, the thermal stability of the receiver core or window material at the temperature of operation, a height at which a receiver is to be used, or any combination thereof. Thus, a receiver-storage unit may comprise a total volume in a range from about 1 m$^3$ to about 200 m$^3$. (A 500 ft. tower may have 1,000,000 square ft or 100,000 m$^2$ of accessible field, covered to about 50% with reflector. At 500 times optical concentration, the receiver aperture can be 100 m$^2$. If the aperture is 1 m in depth and horizontal, the top surface would be 100 m$^2$ and the minimum volume would be 100 m$^3$. An aperture through which solar radiation passes to be incident on the solar radiation absorbing core or body may therefore comprise an opening having an area of the order of about 0.8$^2$ m to about 100 m$^2$. In some variations, an aperture may be adjustable, e.g., to tune the size of the opening. In certain variations, an aperture may be configured with an entry guide such as a flared entry guide, and/or with a focusing element or concentrator such as a compound parabolic concentrator.

As stated above, receivers may be elevated (e.g. tower mounted receivers) or ground mounted receivers. If tower mounted, a receiver may be mounted atop a supporting tower having a height, typically on the order of about 15 m to about any of (50 m, 100 m, and 150 m), which may depend upon the size (ground area) occupied by one or more associated reflector fields, e.g., one or more heliostat fields. The receiver aperture, which may be located in a receiver housing or within a receiver body itself (e.g., as an aperture that leads to a cavity in a receiver body), may be positioned to best receive focused radiation from the reflectors (e.g., heliostats). Thus, the aperture may optionally be positioned on the underside of a tower mounted receiver (e.g., on the underside of a receiver body). For example, as described above, if the aperture is substantially horizontal in a tower mounted receiver, thermal losses due to convection at the aperture may be reduced. If a receiver is located adjacent one end of a reflector field, a receiver aperture (e.g., an aperture in a receiver housing or an aperture in a receiver body or core that leads to a cavity) may for example be positioned adjacent a lower marginal edge of the receiver body. In an alternate arrangement, the receiver may be illuminated as a secondary receiver, for example in a beam down system where a receiver may be mounted at or near ground level. There, one or more fields of reflectors (e.g., heliostats) may reflect concentrated solar radiation to an elevated reflector that, in turn, redirects the solar radiation to the ground or near ground mounted receiver. In such arrangements, a receiver aperture may be optionally located in an upper region of the receiver (e.g., an upper region of the receiver body or core).

Within a receiver, a solar radiation absorbing core or body, and an aperture that determines an irradiation region or surface on the body or core may be configured in various ways. FIGS. 1-7 illustrate some examples of possible receiver configurations.

Referring first to FIG. 1, a variation of a receiver 100 is illustrated that comprises a housing 101 that, in turn, comprises an aperture 103. Within the housing 101 is a solar radiation absorbing body 105 that comprises a refractory material. The refractory material in the body may for example be provided in the form of a monolithic mass, an aggregated material, a particulate material, a powder, a baled material, or any combination thereof. Thus solar radiation, e.g., concentrated solar radiation directed from an array of reflectors (e.g., heliostats) can pass through the aperture 103 to be incident on a surface 107 of the core 105. In this particular variation, the incident surface 107 may be substantially parallel to a plane defined by the aperture 103, e.g., substantially horizontal if the aperture is horizontal. A space 110 between the core and the housing may be at least partially filled with a thermally insulating material (not shown). As described in further detail herein, the core 105 may or may not comprise one or more passageways 109 directed through and/or around the core 105 to convey a working fluid (e.g., air) to extract thermal energy stored in the core via heat transfer.

Figure 2:
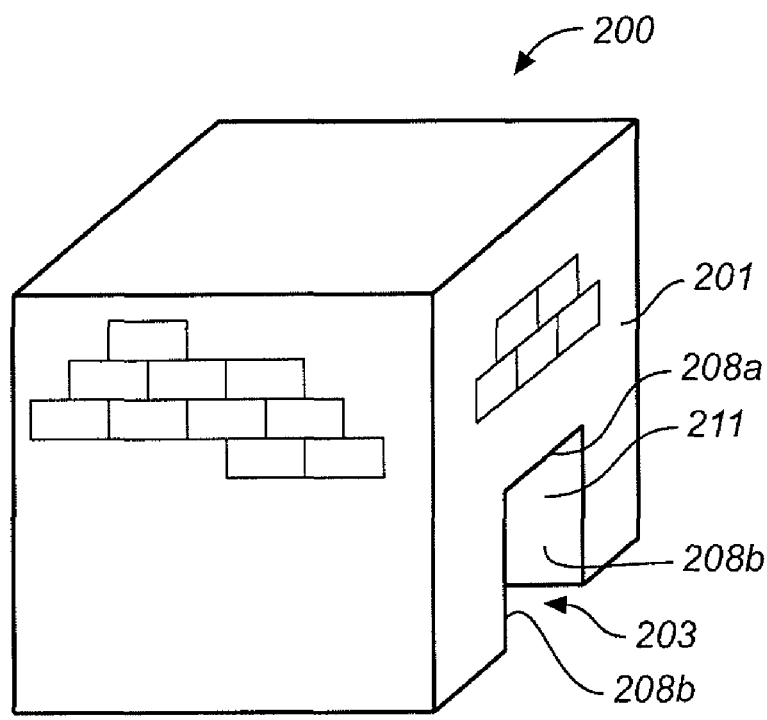
FIG. 2 shows a sectional elevation view of another embodiment of a receiver-storage unit located within a surrounding chamber.

In some instances a receiver and its solar radiation absorbing body may comprise a unitary structure. FIG. 2 illustrates an example of such a receiver. There, the receiver 200 comprises a generally solid unitary receiver body 201 that comprises a refractory material. Thus, incident solar radiation can be directed through aperture 203 to be received into cavity 211 of the receiver core 201. The incident solar radiation may be incident on any or all surfaces 208a and 208b of the cavity 211 to be absorbed and converted into thermal energy that can be stored in the body/core 201 for a desired length of time, e.g., a transient period less than about 15 minutes, or a more extended period (about an hour, several hours, or longer). In this particular variation, cavity 211 provides a top incident surface 208a that may be substantially parallel to a plane defined by aperture 203, as well as side incident surfaces 208b that may be substantially orthogonal to a plane defined by aperture 203. In some variations, receiver 200 may be used in a configuration where aperture 203 is substantially horizontal and opens downward, e.g., for a tower mounted receiver. Although not shown, the body/core 201 may comprise one or more fluid passageways configured to convey a working fluid to extract thermal energy stored in the core.

Figure 3A:
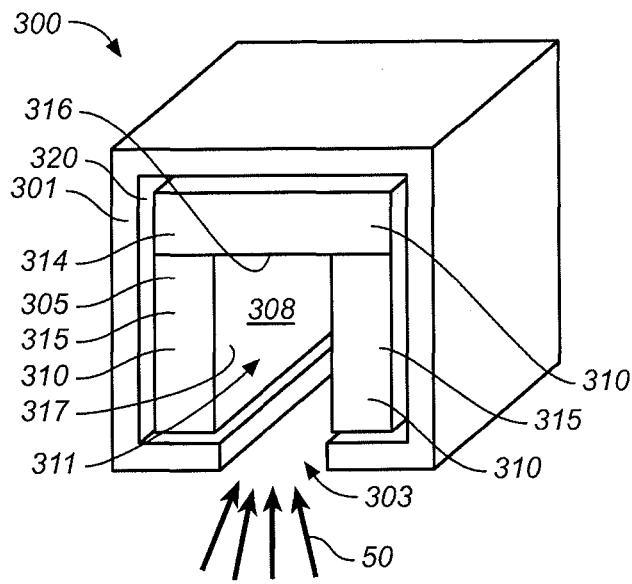
FIGS. 3A and 3B shows sectional perspective views of examples of receivers each comprising downward opening, horizontally oriented apertures.
Figure 3B:
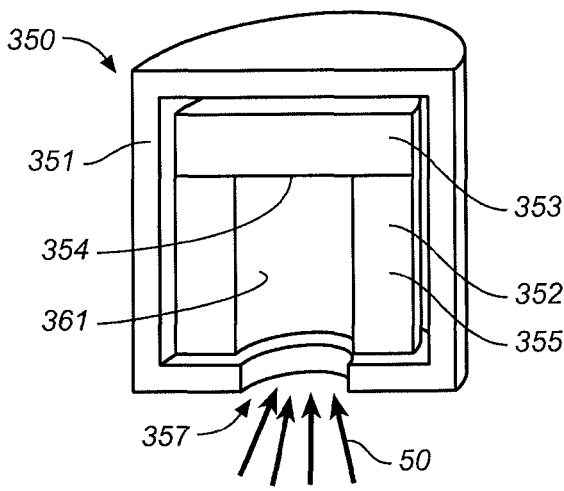

Additional variations of receivers are shown in FIGS. 3A-3B. Referring first to FIG. 3A, receiver 300 comprises a housing 301 and a solar radiation absorbing body 305. Solar radiation can be directed through an aperture 303 to be incident on the body 305. In this particular variation, the body 305 is formed around a peripheral region of the housing 301 so as to form an interior cavity 311. In this particular variation, the body 305 comprises multiple sections 310 that may be arranged in any manner in the housing 301, e.g., to form a cavity 311 having incident surfaces 308 for receiving and absorbing solar radiation 50 that is transmitted through the aperture 303. Although the sections 310 are illustrated as forming a block shaped cavity 311 having a cap 314 and sidewalls 315, other variations are possible, e.g., sections arranged to form a polygonal cavity. The body 305 may comprise an incident surface 316 on cap 314 that is substantially parallel to a plane defined by the aperture 303, and an incident surface 317 on sidewalls 315 that is substantially orthogonal to the aperture plane. Any space between the housing 301 (e.g., space 320) may optionally be at least partially filled with a thermally insulating material. As shown in FIG. 3B, a variation of a receiver 350 is shown in which the receiver housing 351 contains a receiver body 355 comprising a cylindrical section 352 (that may in turn comprise multiple subsections) and a cap section 353 to form a cavity 361 having a circular cross-sectional shape. Thus, an incident surface 354 on the cap 353 may be substantially parallel to a plane defined by an aperture 357 in the receiver housing 351. For either of the variations shown in FIGS. 3A and 3B, the body may comprise one or more fluid passageways (not shown) to convey a working fluid to extract stored thermal energy from the body.

Fluid passageways or fluid channels, if present in a body, may have a variety of configurations, and in general any fluid passageway configuration may be used in combination with any receiver and/or body configuration. Examples of various fluid passageways that may be used to extract stored thermal energy from the refractory bodies described herein are provided in FIGS. 4-7. It should be noted that a single receiver may utilize more than one type of fluid channel; thus, variations are contemplated which include any combination of the fluid channel types. In any of the variations, the way in which the channels are positioned within the body of the receiver may be dependent upon the method employed from one unit to another to construct the receiver body.

Figure 4:
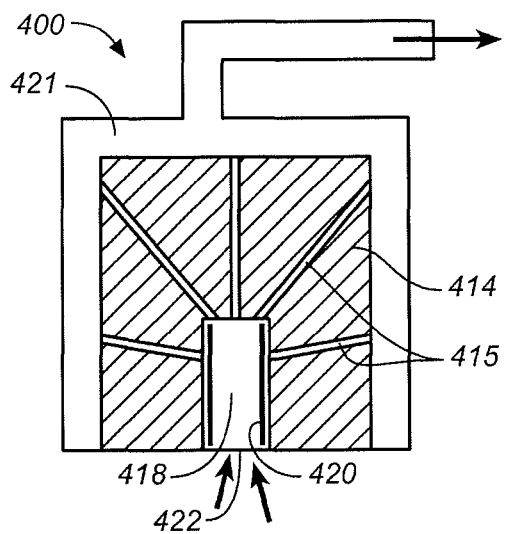
FIG. 4 shows a sectional elevation view of another embodiment of a receiver.

In some variations, the fluid passageways may be directed radially outward from an interior, e.g., central, region of the body to a periphery of the body. Referring now to FIG. 4, receiver 400 comprises a housing 421 containing a solar radiation absorbing body or core 414. The receiver body or core 414 may comprise, or be formed or constructed from a refractory material (as defined above). In some variations, the body or core 414 may be, but need not be, constructed from blocks that comprise (e.g., are composed primarily of) aluminum oxide in a fired, heat resistant clay binder or matrix.

Solar radiation can be transmitted through an aperture 422 to enter an internal cavity 418 of the body 414. Optionally, a cladding layer 420 may at least partially line the cavity 411, e.g., as a protective layer for a refractory material contained within the body 414. The receiver variation shown in FIG. 4 may have any dimensions, and may be formed approximately as a cube with approximately 2.5 m side dimensions, although, depending upon the output power requirements of a system of which the receiver is a part, the receiver may be constructed with a volume within a range of, for example, about 1.0 $m^3$ to about 20.0 $m^3$.

Fluid channels or passageways 415 are provided within the body 414 of the receiver for conveying a working fluid (typically a heat exchange fluid) through the body to extract stored thermal energy. In this particular example, the channels 415 are formed within the body itself, and are directed radially outward from an interior region of the body (e.g., cavity 418) to an outer peripheral region of the body. Thus, in use of this embodiment, a gas such as ambient air may be employed as a working fluid and be forced or drawn through the cavity 418, radially outward through the channels 415, and into a chamber 421 that generally surrounds the receiver body 414, all while the body 414 is being irradiated with concentrated solar radiation through aperture 422. The resulting heated working fluid, e.g., heated air, may be used downstream as a working fluid, or be used to transfer thermal energy to a (further) working fluid, for example to produce superheated steam.

In certain variations, one or more fluid channels or passageways may be directed in a generally transverse manner across a receiver body or core. For example, referring to FIG. 5, receiver 500 comprises a body 515 that comprises two types of fluid channels, 515a and 515b. Incident solar radiation may be transmitted through the aperture 518 and received on any or all of the incident surfaces of cavity 518 (e.g., sidewall surfaces 508b and/or top surface 508a). In this particular example, both fluid channels 515a and 515b extend transversely across the body 514 to convey a working fluid (not shown) to extract thermal energy. In this example, fluid channel 515a follows a generally straight path, whereas fluid channel 515b follows a serpentine path, e.g., to increase a path length of the working fluid through the body 515 so as to extract more thermal energy. Although the fluid channel 515b is illustrated as generally serpentine, any variation of a curvilinear or circuitous channel through the body may be employed to increase a path length.

Some receivers may comprise fluid channels that are located in discrete regions of a receiver body. Such an example is illustrated in FIG. 6. There, receiver 600 comprises a solar radiation absorbing body or core 614, a cavity 618 and an aperture 611. Located within body 614 are one or more pocket-like chambers 617. In these variations, the fluid channels 616 may be located as a separate channel unit within one or more of the pocket-like chambers 617. The pocket like chambers 617 may contain a fluid (e.g., a heat transfer fluid such as air), and the fluid channels 616 may for example comprise a conduit or pipe so as to allow a working fluid contained within the conduit to be heated by a fluid contained in the chambers 617. In other variations, the pocket-like chambers may comprise a solid refractory material, e.g., a monolithic material, an aggregated material, rocks, gravel, sand, or any combination thereof, that may have a different composition and/or different density than the bulk of the core 614. For example, the composition of the core material within the chambers 617 may be selected to have an increased thermal conductivity so as to facilitate improved heat transfer to a working fluid in the fluid channels 616.

As an alternate construction, a receiver may comprise a core that, in turn, comprises one or more particulate refractory materials, as described above. The core may be composed of, or primarily composed of one or more particulate refractory materials. An example of such a receiver is provided in FIG. 7. In this particular example, the core 722 of receiver 710 may comprise (e.g., be formed or constructed from), for example, one or more unbonded thermally conductive (mineral) earthen refractory materials such as rocks, stones, gravel, sand, and combinations thereof. The thermally conductive refractory material may in some cases comprise quartzite. In this embodiment, the refractory core 722 is located within a shell or housing 723 that may comprise a refractory material that may be the same or different as that used in the core. In certain examples, the housing 723 may be formed from bonded blocks of a refractory material, e.g., aluminum oxide. Also metal structures such as fins or a grid or mesh 724 may be disposed within the core 722, e.g., to promote spreading of thermal energy though the core, and/or to promote channeling of the thermal energy into selected particular regions of the core. Although not shown in FIG. 7, an optional casing, e.g., a metal casing, may be used to contain core 722. In those variations, a space that may or may not be at least partially filled with a thermally insulating material, may be provided between the core and the casing. Although this particular variation is illustrated as comprising a cavity 718 for receiving incident solar radiation through the aperture 703, other variations are contemplated that comprise no cavity, so that solar radiation can be incident on a surface of core 722, e.g., a relatively planar surface.

For receivers comprising a particulate core, such as illustrated in FIG. 7, particles sizes, particle size distribution, and a packing density may be such that one or more fluid passageways may be established though interconnected interstitial spaces in the core. With this arrangement, a heat exchange fluid such as ambient air may be drawn or forced through such passageways the core (e.g., via cavity 718, if present) and be conveyed form the receiver by a feed line 725, either directly or by way of a plenum or the like (not shown). The resulting heated fluid (e.g., heated air) may then be used as a working fluid for example in an energy generating cycle. Alternatively or in addition, the resulting heated fluid may be used to transfer thermal energy contained therein to a (further) working fluid such as water.

For any of the receiver variations, an incident surface (e.g., a cavity surface such as 208a and 208b in FIG. 2) of the receiver body or core may be clad with a protective cladding or liner (e.g., cladding 420 as illustrated in FIG. 4). Such a cladding, if present, may function for example to inhibit ablation and/or sublimation of the refractory material in the body or core, e.g., a refractory material that forms one or more walls of a cavity into which solar radiation is directed. Certain variations of claddings may b removably secured to an incident surface (e.g., in a cavity) so as to permit replacement, e.g., in the event of undesired surface erosion or damage.

For any of the receiver variations, a refractory material may have any suitable composition and may be in any form, e.g., monolithic, molded, aggregated, particulate, powdered, or any combination thereof. In general, the refractory material in the receiver may comprise any refractory material that is substantially opaque to solar radiation and remains substantially stable when exposed to temperatures that are established with absorption of concentrated solar radiation, e.g., continuous operation at a temperature of about 800° C. or higher as described above, e.g., about 800° C. to about 3000° C., or about 800° C. to about 2500° C. Some of the refractory materials may be able to withstand continuous operation at temperatures of at least about 1000° C., or at least about 1200° C., or even higher. In certain variations, a receiver body or core may comprise a combination of refractory materials. A refractory material may comprise a refractory metal, a ceramic, and/or a cermet. Non-limiting examples of refractory materials that may be used include alumina, silica, carbon, magnesia, zirconia, silicon carbide, titanium carbide, tantalum carbide, chromium carbide, niobium carbide, zirconium carbide, molybdenum disilicide, calcium oxide, graphite, chromite, dolomite, magnesite, quartzite, aluminium silicate, tungsten, molybdenum, niobium, tantalum, rhenium, beryllium, and combinations thereof.

As stated above, an aperture in a receiver (e.g., in a housing or in a receiver body or core itself), may have a cross-sectional area of the order of about 0.8 m² to about 7.0 m². In some variations, an aperture may be adjustable, e.g., to tune the size of the opening. Although not so shown in the variations of receivers illustrated herein, any aperture may be fitted with a window that is substantially transparent to the solar spectrum over a wavelength range of interest, e.g., a quartz window. In certain variations (and also not shown), one or more optical elements, e.g., a radiant energy concentrator, may be placed in the aperture to condition the incident solar radiation.

For any of the receiver variations described herein, a heat exchange fluid may be thermally contacted with a surface of the receiver body or core to extract thermal energy from the surface. This heat exchange scheme may be used alternately to or in addition to a thermal extraction scheme involving conveyance of a heat exchange fluid though a passageway in a core. For example, a heat exchange fluid in contact (e.g., physical and/or thermal contact) with a surface of the receiver body or core, or one or more pipes containing the heat exchange fluid that is in thermal contact with a surface of the core, may be used to extract thermal energy from the body or core.

FIG. 8 provides an example of receiver in which extraction of heat by a heat exchange fluid occurs at a surface of the receiver core. There, receiver 800 comprises a solar radiation absorbing core 814 comprising a refractory material. Bulk absorption of solar energy that passes through the aperture 822 (and in this variation enters cavity 818) results in thermal energy generation and storage in the core 814. A heat exchange fluid contained in a manifold 826 may be placed in thermal contact with an external surface 810 of the core 814 to extract stored thermal energy from the core for use, e.g., in driving an energy generating cycle. Although not shown in FIG. 8, the core itself may comprise one or more internal fluid passageways (e.g., as shown above) for conveying a working fluid to extract thermal energy from the bulk of the core 814. Thus, receivers may comprise an external means for heat extraction via external thermal contact with an external surface of a refractory body or core, e.g., as illustrated in FIG. 8, and/or one or more fluid channels configured for conveying a working fluid in and/or around a refractory body or core, as described herein.

In some variations of receivers, a displacement between the aperture through which solar radiation is directed and the solar radiation absorbing body may be adjusted or selected to determine an energy density or intensity of the solar radiation that is incident on the body. For example, the displacement between the aperture and the core may be adjusted or selected to increase an energy collection efficiency of the receiver. Such adjustment may be completed at installation, may be carried out periodically or regularly, and may be completed manually or automatically. For example, such adjustment may be made to account for seasonal variations, and/or aging of a receiver. Referring now to FIG. 9, a variation of a receiver is illustrated in which a displacement between a receiver aperture and an incident surface of a receiver core can be varied. There, receiver 900 comprises a housing 901 that, in turn, comprises an aperture 903. Contained within the housing 901 is a solar radiation absorbing body or core 914. Solar radiation (e.g., concentrated solar radiation reflected by one or more reflectors such as heliostats) is transmitted through the aperture 903 to be incident on an incident surface 915 of the receiver body or core 914. Body 914 comprises a refractory material, as described above, and may or may not comprise one or more fluid passageways, as described above. In general the incoming solar radiation 50 has been focused by a reflector, so that an incident beam may be converging or diverging as it enters the aperture 903 and impinges upon surface 915, depending on where a focal point, or region of highest concentration, occurs in the reflected radiation's path from a reflector to the receiver 900. Thus, a displacement 916 between a plane defined by the aperture 903 and the incident surface 915 may be adjusted to determine an energy density or intensity incident on the surface 915. Further, a cross-sectional dimension 917 of the aperture 903 may be adjusted, which may also affect the energy density or intensity incident on the surface 915.

In certain variations, focusing properties of a reflector and a distance between the reflector and the receiver may be adjusted so that reflected solar radiation reaches a focal point, or region of highest energy concentration approximately at or prior to reaching a plane defined by the aperture. Such a situation is illustrated in FIG. 10. There, receiver 1000 comprises a housing 1001 that, in turn, contains a refractory core 1014 having a surface 1015 for receiving incident solar radiation to allow bulk absorption of at least a portion of that radiation and subsequent bulk heating in the core 1014. Solar radiation is incident on one or more reflectors 1040 in an array 1041. The reflectors (e.g., fixed horizontal axis and/or fixed vertical axis heliostats) may be configured to track the sun and reflect incident solar radiation to the receiver 1000. In this particular variation, the reflectors 1040 are focusing reflectors. A distance between a reflector and a receiver, combined with focusing properties of that reflector, determine a focal point, or at least a region of highest energy concentration for radiation that is not sharply focused, of the reflected solar radiation 50. In some cases, a receiver may be positioned so that a focal point or region of highest energy concentration (e.g., indicated as region 1039 in FIG. 10) occurs approximately at or prior to the aperture, so that solar energy incident on a surface of a refractory core is divergent. Thus, intensity variations on the incident surface may be reduced, e.g., so that approximately uniform irradiation of the incident surface of the solar radiation absorbing core may be achieved, which may allow overall higher incident solar radiation energy densities to be used, increase conversion efficiency of the receiver, and/or reduce local hotspots and the like that can degrade performance, and in some cases, lead to catastrophic failure. In some instances, a displacement between the aperture 1003 and the incident surface 1015 of the core may be adjusted so as to approximately image at least a portion of the reflector array 1041 on the surface 1015. By adjusting a displacement 1016 between the incident surface 1015, and optionally a cross-sectional dimension of the aperture 1003, and optionally a position of the focal point of the reflected solar radiation 50 relative to the aperture, an energy density or intensity incident on the surface 1015 of the core 1014 may be controlled.

The receivers as described herein may be used in methods for effecting heat exchange to generate thermal energy from solar energy are also described here. In general, the methods comprise directing concentrated solar radiation through a receiver aperture so that solar radiation is incident on a receiver core. Any of the receivers described above, including any variation of receiver core and any variation of aperture, may be used. Thus, the methods may comprise utilizing a receiver that comprises a core composed primarily from a refractory material or a combination of refractory materials. The methods further comprise transferring thermal energy stored in the core following bulk absorption of incident radiation by passing the working fluid through one or more passageways in and/or around the core, as described above. The methods may comprise directing concentrated solar radiation through the aperture to be incident on the core so that the core reaches a continuous operating temperature of about 800° C. or higher, e.g., about 1000° C. or higher, or about 1200° C. or higher. The working fluid may be passed through the passageway or passageways by using any suitable technique, e.g., the working fluid may be pumped or drawn through a passageway. The working fluid used in the methods may be any suitable working fluid, but in many cases may comprise primarily air.

The methods may comprise passing a working fluid through any one of a variety of configurations of passageways to extract stored thermal energy from the core. For example, methods may comprise flowing the working fluid through a passageway directed radially outward from an interior region to a peripheral region, or through a serpentine, helical or other circuitous passageway. Certain methods may comprise flowing a working fluid through a refractory core comprising a particulate aggregate.

The methods may be used with tower mounted receivers, or receivers mounted at or near ground level. In any case, the methods may comprise adjusting a cross-sectional dimension of a receiver aperture and/or a displacement between the aperture and an incident surface of a core, e.g., to adjust an energy density or intensity incident on the core and/or to increase a collection efficiency of the receiver. For example, the methods may comprise directing concentrated solar radiation through a receiver aperture so that a point or region of maximum energy density or intensity occurs at or before the aperture where materials which can overheat are not present, and so that the solar radiation is at least somewhat divergent as it impinges on the core. As described above, certain methods may comprise directing the concentrated solar radiation to be incident on a substantially horizontal surface of the core, or to be incident on a substantially vertical surface of the core, or a combination thereof. Certain ones of the methods may comprise at least partially imaging an array of reflectors on a substantially horizontal incident surface of the core, where the array of reflectors is used to direct solar radiation through the aperture. Any type or configuration of reflectors may be employed to direct concentrated solar radiation through the aperture to be incident on the core. For example, an array comprising fixed horizontal axis and/or fixed vertical axis heliostats may be used.

Certain other methods for effecting energy exchange between solar radiation and a working fluid are disclosed. These methods comprise directing concentrated solar radiation through a substantially horizontally oriented aperture in a lower portion of a body of a tower mounted receiver so that the solar radiation is incident on and absorbed by a core disposed within the body to generate thermal energy in the core. The core comprises a refractory material. The methods further comprise transferring thermal energy from the core to a working fluid, e.g., a working fluid that comprises air. Variations of the methods may comprise flowing the working fluid through one or more passageways in and/or around the core to facilitate extraction of thermal energy from the core. Any type or configuration of passageway may be used in these methods. Further, these methods may comprise adjusting a displacement between the aperture and an incident surface of the core so as to adjust an energy density or intensity incident on the core and/or an efficiency of the receiver.

Figure 11:
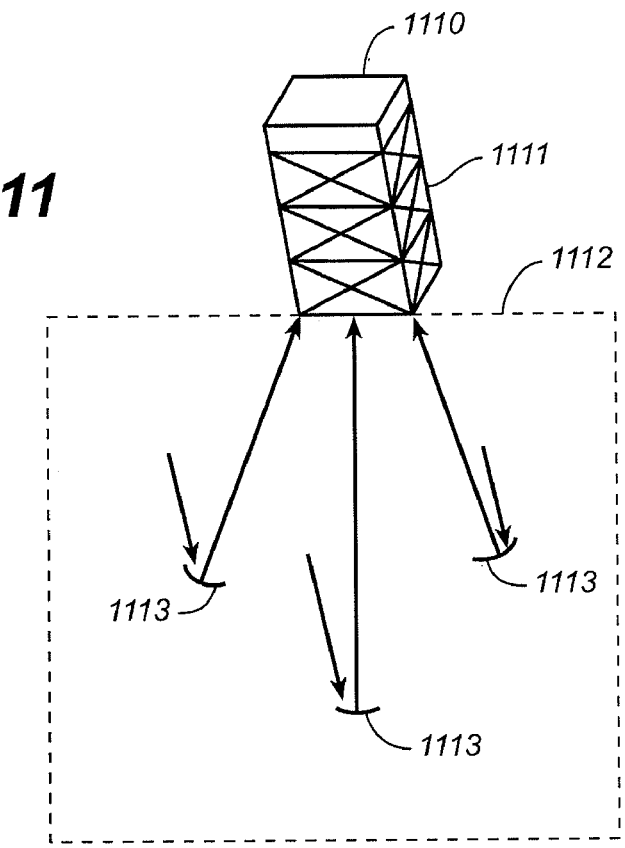
FIG. 11 illustrates an example of a tower-mounted receiver-storage unit positioned adjacent a field of heliostats.

The receivers and methods as described herein may be used in a variety of configurations in solar energy collector systems. An example of a tower mounted receiver for receiving energy from one or more reflector fields is provided in FIG. 11. There, a receiver-storage unit (hereinafter referred to simply as a "receiver") 1110 is positioned at or near the top of a steel tower 1111 (e.g., a skeletal or space frame steel tower) that is located in proximity to (e.g., adjacent one end of) a field 1112 of reflectors 1113, which may for example comprise heliostat reflectors. Four only reflectors are for convenience shown in the figure but a single tower mounted receiver would normally be associated with a very much larger number of reflectors. Also, in an alternative arrangement a plurality of spaced-apart tower-mounted receivers might be positioned within or at the margins of a large field of reflectors. In either of these optional cases, the reflectors may be controlled and driven for orientation toward a single receiver or to be re-orientated from one receiver to another in order to optimise solar energy collection and to minimise the possibility of reflector shading. Although the receiver 1110 is illustrated as being positioned on an end of field 1112 in FIG. 11, the field 1112 and the reflectors 1113 within the field may have any suitable arrangement with respect to the receiver 1110. For example, in some variations, reflectors 1113 may be arranged circumferentially with respect to receiver 1110, e.g., so that the solar radiation directed to the receiver takes on a generally conical shape. In other variations, the reflectors 1113 may be arranged in arcs or rows. Such arcs or rows may be arranged symmetrically with respect to the receiver 1110, or may be arranged preferentially on one or more sides of the receiver 1110.

In certain other alternative arrangements, a receiver may be mounted at or near ground level, e.g., as a secondary receiver in a beam down configuration as described above. There, an elevated reflector may be configured to receive reflectors solar radiation from one or more reflector fields, similar to field 1112 illustrated in FIG. 11. The elevated receiver may redirect the reflected radiation downward so as to be transmitted through an upward opening aperture of a receiver as described herein. Larger refractive cores may be accommodated in such a ground mounted arrangement.

The height of the tower 1111 may be determined, at least in part in any given case by the size (area) of the reflector field (and hence by the distance between the farthest reflector 1313 and the tower) and, to some extent, by the spatial relationship of the reflectors. However, the tower may typically have a height in the range from about 15 m to about 50 m.

Each reflector 1313 may comprise a two-axis heliostat having a fixed vertical axis but, in the interest of achieving increase ground coverage with the reflectors, each reflector may desirably comprises one having a fixed horizontal axis, for example as disclosed in Australian Provisional Patent Application No. 2007900391, dated Jan. 29, 2007 and International Patent Application No. PCT/AU2008/000095, entitled "Solar Energy Collector Heliostats" filed Jan. 29, 2008, each of which is incorporated by reference herein in its entirety. In some variations, a collision avoiding solar tracking system of the type disclosed in Australian Provisional Patent application No. 2007900390, dated Jan. 29, 2007 and in International Patent Application No. PCT/AU2008/

000096, dated Jan. 29, 2008, each of which is incorporated by reference herein in its entirety, may be employed for driving heliostats.

The reflectors (e.g., heliostats) may in use be driven to track east-to-west progression of the sun during each diurnal period and to reflect incident solar radiation into an aperture (referred to in more detail above) of the receiver 1110. In the case where a plurality of spaced-apart receivers 1110 is located within a reflector field 1112 or the receivers are located at, for example, opposite ends of a field, various ones of the reflectors may be orientated to reflect radiation to one only of the receivers, or some of the reflectors may be driven selectively to pivot to such an extent as to shift the reflected radiation from one receiver to another. Non-limiting examples of reflectors that may be reoriented to direct incident solar radiation from one tower to another are described in U.S. Pat. No. 5,899,199 issued May 4, 1999 to David Mills, which is incorporated by reference herein in its entirety. In any event, the reflectors may function collectively to concentrate solar radiation at or near the aperture of the receiver or, if more than one, multiple receivers, as is described above, e.g., in connection with FIGS. 9 and 10.

Receivers as described herein may function to heat a working fluid in a heat engine employing e.g. a Brayton cycle. Examples of energy generating cycles and combined cycle power plants using solar radiation absorbing refractory receivers to heat a working fluid are provided in U.S. patent application Ser. No. 12/157,067, entitled "Combined Cycle Power Plant," filed concurrently herewith, and U.S. Provisional Patent Application Ser. No. 60/933,619, entitled "Combined Cycle Power Plant", filed Jun. 6, 2007.

Figure 12:
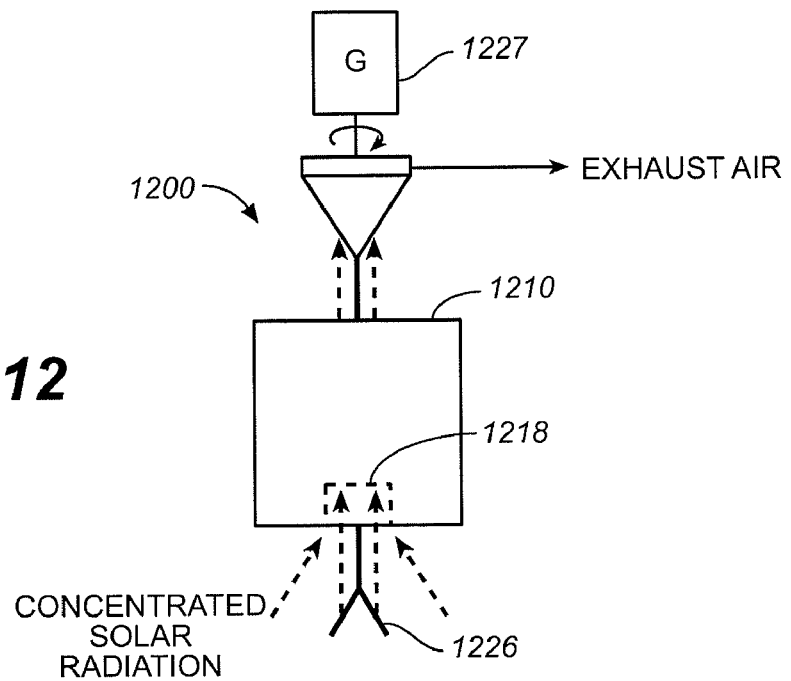
FIG. 12 is a schematic representation of an electrical energy generating system configured to operate in a quasi-isothermal Brayton cycle and incorporating a receiver-storage unit of a type described herein.

FIG. 12 provides an example of a heating stage that can be used to heat a working fluid (e.g., air). There, heating stage 1200 comprises a receiver 1210 having any configuration as described herein that is interposed between a compressor-turbine 1226 and a turbo-generator 1227. The compressor 1226 is employed to force compressed air into the cavity 1218 of the receiver 1210 and the turbo-generator 1227 is driven by high-energy-level air following its passage through the receiver. Even though the heating stage 1200 in this variation is solar powered, the energy storage capabilities of the receiver 1210 used to heat the working fluid may dampen or reduce fluctuations in heat that may result from periods of low insolation. The storage capacity of the receiver 1210 may be selected so that the supply of heated compressed air is sufficiently stable to drive turbo generator 1227, e.g., without the need for auxiliary or supplemental fuel to power heating stage 1200. Although the heating stage 1200 is illustrated in connection with a Brayton cycle heat engine in FIG. 12, the receivers as described herein may be used in other heating cycles that may be used in other types of energy generating cycles that employ a heated working fluid.

Figure 13:
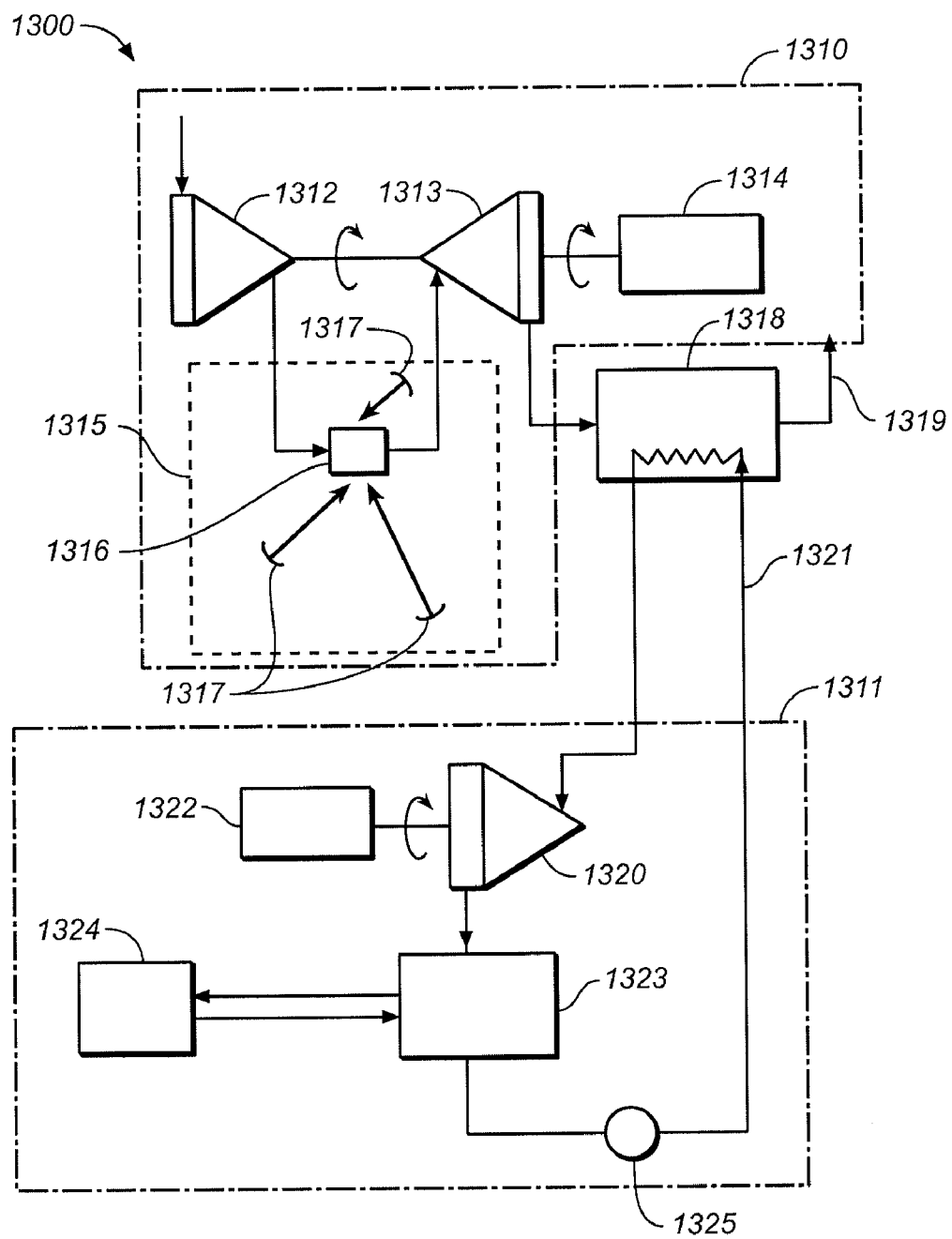
FIG. 13 is a schematic representation of combined cycle electrical generating system incorporating a receiver-storage unit of a type described herein.

FIG. 13 illustrates an example of a combined cycle power plant utilizing a receiver as described herein. There, power plant 1300 comprises two interconnected power generating systems; a first of which (designated by numeral 1310) is a heat engine employing a Brayton cycle and the second of which (designated by numeral 1311) is a heat engine employing a Rankine cycle. The first system 1310 comprises a turbo-compressor 1312, to which a first working fluid in the form of ambient air is admitted, and a gas turbine 1313 which provides rotary drive to both the turbo-compressor 1312 and an electric generator 1314. Following its compression the first working fluid is heated in a heating system 1315 and is delivered to the turbine 1313 where it expends a major part of its acquired energy by expanding through and driving the turbine 1313.

In the power plant variation illustrated in FIG. 13, one or more receivers 1316 (as described herein, and which may be tower mounted or ground mounted) receives and absorbs concentrated solar radiation reflected by one or more fields of reflectors 1317, which may be for example any heliostats as described herein or otherwise known (e.g., fixed vertical axis two-axis heliostats or fixed horizontal axis two-axis heliostats). Only three reflectors 1317 are for convenience shown in FIG. 13 but, depending upon a desired power output capacity of the turbine 1313-generator 1314 set, one or more reflector fields may normally comprise many hundreds of reflectors, e.g., heliostats. Although not so shown in FIG. 13, if the receiver 1316 is a tower-mounted receiver, the compressor 1312, turbine 1313 and first generator 1314 may also be mounted on the tower as a quasi-integrated assembly on the tower. Such an arrangement may avoid or reduce the need to transport very high temperature gas from the receiver 1316 to ground level where the first turbine 1313 and first generator 1314 might alternatively be located. Having expanded through the gas (first) turbine 13, in certain variations at least a portion of the first working fluid may be directed to a mediating thermal energy storage system 1318 where residual thermal energy contained in the first working fluid is released (by heat exchange) to a thermal energy storage medium within the thermal energy storage system 1318. Examples of mediating thermal energy storage units are described in U.S. patent application Ser. No. 12/157,067, entitled "Combined Cycle Power Plant", filed concurrently herewith, and U.S. Provisional Patent Application Ser. No. 60/933,619, filed Jun. 6, 2007, each of which has already been incorporated by reference herein in its entirety. Then, having expended all (or, at least, a majority) of its acquired energy, the first working fluid may be exhausted to the atmosphere as indicated by numeral 1319. Of course, if no mediating thermal energy storage unit is employed, the first working fluid may be exhausted immediately after turbine 1313.

The second system or cycle 1311 within the power plant 1300 comprises a second turbine 1320 (e.g., a steam turbine) through which a second working fluid is directed by way of a closed loop 1321. The second working fluid comprises condensed water, saturated vapour (wet steam) and superheated steam, depending upon its position within the loop 1321. Superheated steam is admitted to and expands through the turbine 1320 and the resultant expended energy is applied to drive a second electric generator 1322. Although not shown, the electrical output from the first generator 1314 and the second generator 1322 may each be delivered to an electricity supply grid.

Having expanded through the steam turbine 1320, residual steam/vapour is delivered to a condenser 1323 where sensible and latent heat is removed by a condenser coolant fluid that is recirculated through a condenser fluid coolant system 1324. The condenser may comprise any one of a number of different types of condensers, including shell-and-tube condensers and direct contact condensers, but in certain variations a condenser may comprise a direct contact condenser in which coolant fluid is contacted with the second working fluid. The condenser coolant fluid cooling system may embody evaporative cooling, forced air cooling, subterranean heat exchange, or any combination thereof.

In an alternative (not illustrated) embodiment, air cooled condensing may be employed for condensing the output vapour from the turbine 1320. In such case, and if the plant comprises a solar energy collector system such as that indicated by reflector field 1315, a plurality of air cooled condensers may be positioned within the reflector field 1315 and draw coolant air from a zone shaded by the reflectors 1317.

Non-limiting examples of air cooled condensers that may be used in connection with the power plants disclosed herein are provided in U.S. patent application Ser. No. 12/135,039, entitled "Convective/Radiative Cooling Of Condenser Coolant", filed Jun. 6, 2008, and U.S. Provisional Patent Application Ser. No. 60/933,574, entitled "Convective/Radiative Cooling Of Condenser Coolant", filed Jun. 6, 2007, each of which is incorporated by reference herein in its entirety.

Still referring to FIG. 13, the second working fluid in its liquid phase may be delivered by a pump 1325 from the condenser 1323 to a heat exchanger (e.g., a heat exchanger within a thermal energy storage system 1318, if present, where thermal energy, e.g., residual thermal energy recovered from the first cycle 1311 which may or may not have been stored in a storage unit 1318, and/or thermal energy supplied by any type of energy source, is transferred by heat exchange to the second working fluid in an amount to generate superheated steam for delivery to the steam turbine 1320. Thus, the first cycle or system 1310 combines with the second cycle or system 1311 to provide at least a portion of the thermal energy required to power the second system.

This disclosure is illustrative and not limiting. Further modifications will be apparent to one skilled in the art in light of this disclosure and such modifications are intended to fall within the scope of the appended claims. Each publication and patent application cited in the specification is incorporated herein by reference in its entirety as if each individual publication or patent application were specifically and individually put forth herein

What is claimed is:

1. A receiver for use in a solar energy collector system, the receiver comprising:
   a housing having an aperture adapted to receive solar radiation therethrough;
   a core disposed in the housing, the core configured to absorb solar radiation directed through the aperture in the housing, the core composed primarily of a refractory material, the refractory material being selected from the group consisting of alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminium silicate, tungsten, molybdenum, niobium, tantalum, rhenium, beryllium, and combinations thereof; and
   one or more fluid passageways in the core for conveying a working fluid through and facilitating extraction of thermal energy from the core;
   wherein the core is configured to store thermal energy during periods of low insolation; and
   wherein a displacement between the aperture and the core is adjustable to adjust an energy density of the solar radiation incident on the core.

2. The receiver of claim 1, wherein the aperture is situated on a lower surface of the housing and is substantially horizontally oriented.

3. The receiver of claim 1, wherein an incident surface of the core is substantially horizontal.

4. The receiver of claim 1, wherein an incident surface of the core is substantially vertical.

5. The receiver of claim 1, wherein the refractory material comprises one that is substantially opaque to solar radiation and remains substantially stable when exposed to temperatures that are established with absorption of concentrated solar radiation.

6. The receiver of claim 1, comprising a cladding layer disposed on the core.

7. The receiver of claim 1, wherein the core comprises an aggregate, and the one or more fluid passageways are formed from interconnected interstitial spaces in the aggregate.

8. The receiver of claim 1, wherein at least one passageway is directed radially from an interior portion of the core to a peripheral portion of the core.

9. The receiver of claim 1, wherein the core comprises one or more metal structures configured to distribute heat in the core or into a fluid such as air passing through the core.

10. A receiver for use in a solar energy collector system, the receiver comprising:
    a housing comprising a horizontally oriented downward opening aperture; and
    a solar radiation absorbing core comprising a refractory material selected from the group consisting of alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminium silicate, tungsten, molybdenum, niobium, tantalum, rhenium, beryllium, and combinations thereof;
    the refractory material being disposed above the aperture, so that solar radiation directed through the aperture is incident on the core to generate thermal energy in the core,
    wherein the core is adapted to store the thermal energy to accommodate transitory loss or reduction of solar energy impingement in the core due to periods of low insolation;
    wherein the core is also adapted to move relative to the aperture to adjust an energy density of solar radiation on the core; and
    wherein the receiver is mounted on a tower.

11. The receiver of claim 10, further comprising at least one passageway located within the core for conveying a working fluid through and facilitating extraction of thermal energy from the core.

12. The receiver of claim 10, wherein an incident surface of the core is substantially horizontal.

13. The receiver of claim 10, wherein the refractory material comprises one that is substantially opaque or absorbing to solar radiation and remains substantially stable when exposed to temperatures that are established with absorption of concentrated solar radiation.

14. The receiver of claim 10, comprising a cladding layer disposed on the core.

15. The receiver of claim 11, wherein the core comprises an aggregate, and the at least one passageway comprises interconnected interstitial spaces in the aggregate.

16. The receiver of claim 11, wherein one or more of the at least one passageway is directed radially from an interior portion of the core to a peripheral portion of the core.

17. The receiver of claim 11, wherein the core comprises one or more metal structures configured to distribute heat in the core.

18. A receiver for use in a solar energy collector system, the receiver comprising:
    a body having at least a major part of its volume composed of a refractory material for storing thermal energy during periods of low insolation, the refractory material being selected from the group consisting of alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminium silicate, tungsten, molybdenum, niobium, tantalum, rhenium, beryllium, and combinations thereof;

a cavity provided within the body and having an aperture through which concentrated solar radiation is in use focused to impinge on a wall of the cavity so that thermal energy is received; and at least one passageway located within the body for conveying a working fluid through and facilitating extraction of thermal energy from the body;

wherein a displacement between the aperture and an incident surface of the body is adjustable to adjust an energy density of solar radiation on the incident surface.

19. The receiver of claim 10, wherein an incident surface of the core is substantially inclined toward a reflector field substantially positioned on one side of the tower.

20. The receiver of claim 1, wherein the refractory material is formed of a compound that absorbs the majority of solar radiation and remains substantially stable when exposed to temperatures that are established with absorption of concentrated solar radiation.

21. The receiver of claim 1, wherein the refractory material has features such as cavities or channels that absorb the majority of solar radiation and such that the receiver remains substantially stable when exposed to temperatures that are established by absorption of concentrated solar radiation.

22. The receiver of claim 10, wherein the aperture is offset from a center of the receiver to receive at least a majority of radiation from a field of reflectors positioned to a side of the receiver.

23. The receiver of claim 10, wherein the core is offset from a center of the receiver to receive at least a majority of radiation from a field of reflectors positioned to a side of the receiver.

24. A receiver for use in a solar energy collector system, the receiver comprising:

an aperture; and a solar radiation absorbing core for receiving and storing thermal energy during periods of low insolation, the solar radiation absorbing core further comprising a refractory material disposed above the aperture, so that solar radiation directed through the aperture is incident on the core to generate thermal energy in the core;

the refractory material being selected from the group consisting of alumina, silica, magnesia, zirconia, silicon carbide, titanium carbide, tantalum carbide, chromium carbide, niobium carbide, zirconium carbide, molybdenum disilicide, calcium oxide, chromite, dolomite, magnesite, quartzite, aluminium silicate, tungsten, molybdenum, niobium, tantalum, rhenium, beryllium, and combinations thereof;

wherein the receiver is mounted on a tower;

wherein the receiver is inclined and faces toward a solar radiation reflector field below in a manner that solar radiation is directed totally or partly from one side of the tower through the aperture and is incident on the core; and wherein a displacement between the aperture and an incident surface of the core is adjustable to adjust an energy density of solar radiation on the core.

25. The receiver of claim 1, wherein a cross-sectional dimension of the aperture is adjustable so as to affect the energy density of solar radiation incident on the core.

26. The receiver of claim 10, wherein a cross-sectional dimension of the aperture is adjustable so as to affect the energy density of solar radiation on the core.

27. The receiver of claim 18, wherein a cross-sectional dimension of the aperture is adjustable so as to affect the energy density of the solar radiation on the incident surface.

28. The receiver of claim 24, wherein a cross-sectional dimension of the aperture is adjustable so as to affect the energy density of solar radiation on the core.

* * * * *